United States Patent
Ichishi et al.

(10) Patent No.: US 6,347,987 B1
(45) Date of Patent: Feb. 19, 2002

(54) VEHICLE AIR CONDITIONER WITH LOUVER OPERATION CONTROL

(75) Inventors: Yoshinori Ichishi, Kariya; Takayoshi Kawai, Hoi-gun; Katsuhiko Samukawa, Kariya; Toshifumi Kamiya, Takahama; Yuichi Kajino, Nagoya; Akira Ohga, Kariya; Hikaru Sugi, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/448,773

(22) Filed: Nov. 24, 1999

(30) Foreign Application Priority Data

Nov. 25, 1998 (JP) .......................... 10-334011
Oct. 7, 1999 (JP) .......................... 11-286581

(51) Int. Cl.⁷ .............................. B60H 1/24
(52) U.S. Cl. ........................ 454/75; 454/153
(58) Field of Search ................ 454/153, 285, 454/75

(56) References Cited

U.S. PATENT DOCUMENTS

| 5,176,568 A | * | 1/1993 | Nagatomo et al. | .......... 454/285 |
| 5,242,325 A | * | 9/1993 | Nukushina | ................ 454/285 |
| 5,251,814 A | * | 10/1993 | Warashina et al. | ...... 454/285 X |
| 5,337,802 A | * | 8/1994 | Kajino et al. | .............. 454/75 X |
| 5,660,588 A | * | 8/1997 | Kotoh et al. | ................ 454/285 |
| 5,738,580 A | * | 4/1998 | Baek | ..................... 454/153 X |
| 5,775,989 A | * | 7/1998 | Choi | ........................ 454/285 |

FOREIGN PATENT DOCUMENTS

| JP | 56-149210 | * | 11/1981 | ................ 454/153 |
| JP | 57-101242 | * | 6/1982 | ................ 454/153 |
| JP | 57-148132 | * | 9/1982 | ................ 454/153 |
| JP | 58-85040 | * | 5/1983 | ................ 454/285 |
| JP | 59-156815 | * | 9/1984 | ................ 454/153 |
| JP | 63-173718 | * | 7/1988 | ................ 454/153 |
| JP | 63-271057 | * | 11/1988 | ................ 454/153 |
| JP | 3-70931 | * | 3/1991 | ................ 454/285 |
| JP | 2-7-102775 | | 11/1995 | |

* cited by examiner

Primary Examiner—Harold Joyce
(74) Attorney, Agent, or Firm—Harness, Dickey & Pierce, PLC

(57) ABSTRACT

A vehicle air conditioner includes an air conditioning unit where temperature adjustments of both right and left-seat side air-conditioning zones are independently performed. In the vehicle air conditioner, a swing range of right-seat side center louvers provided in a right center face air outlet is restricted from a front right-seat direction to a rear left-seat direction, and a swing range of left-seat side center louvers provided in a left center face air outlet is restricted from a front left-seat direction to a rear right-seat direction. Thus, right-left independent temperature control can be accurately performed in the vehicle air conditioner.

37 Claims, 27 Drawing Sheets

FIG. 15
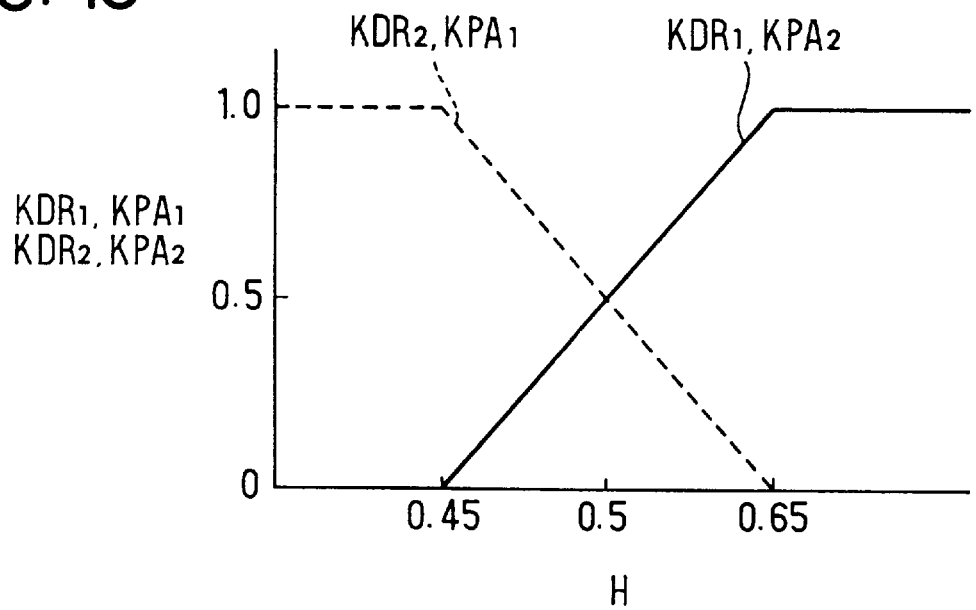
FIG. 16A
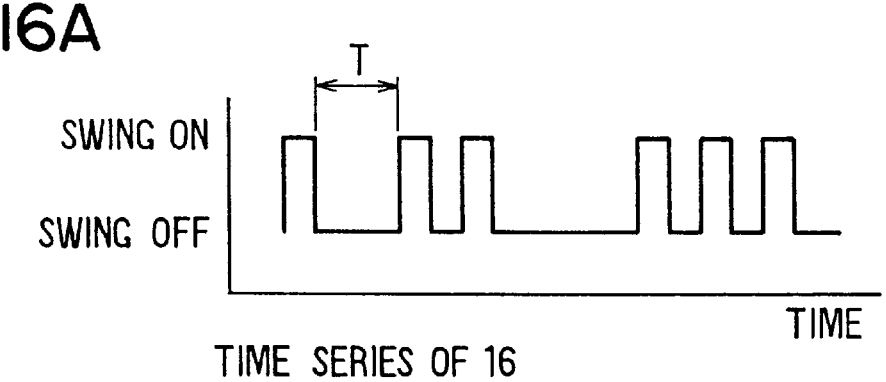
TIME SERIES OF 16
FIG. 16B
OFF TIME SERIES
T(sec) = 1, 1, 10, 1, 30, 1, 1, 1, 1, 20, 1, 10, 20, 40, 10, 10

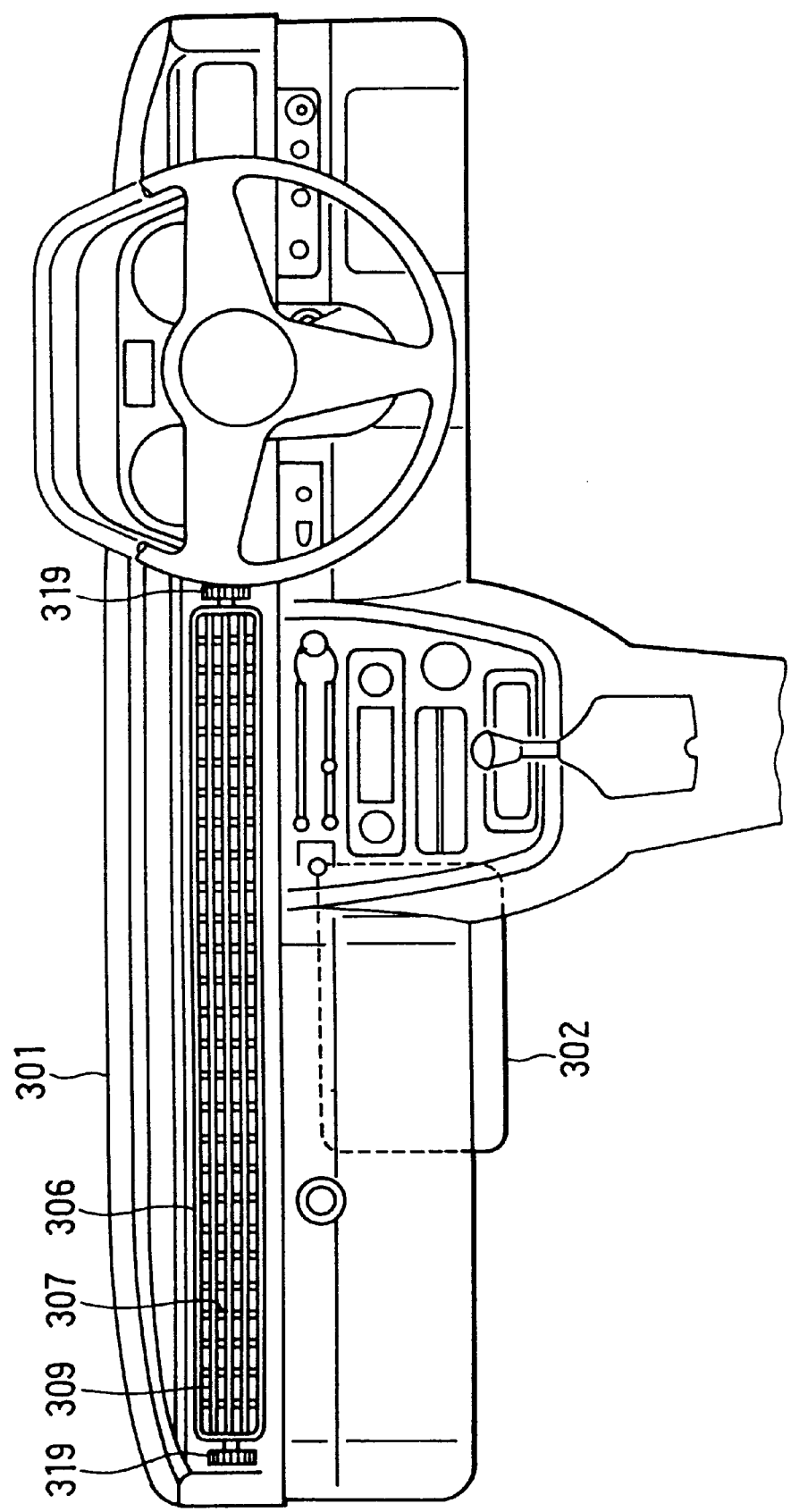

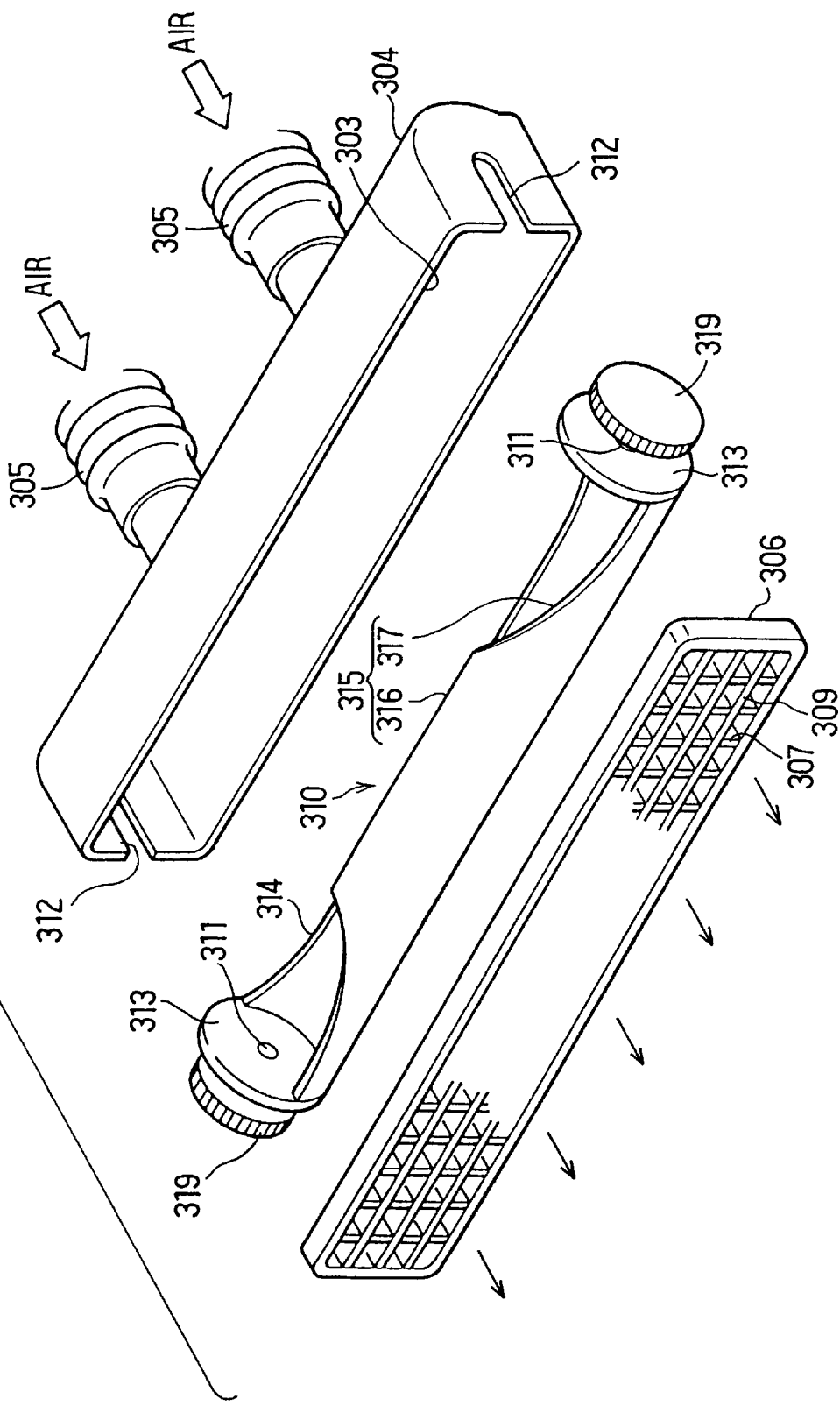

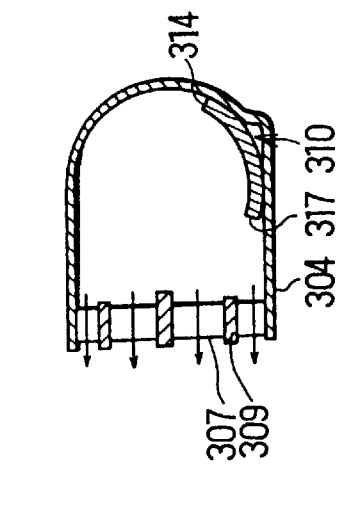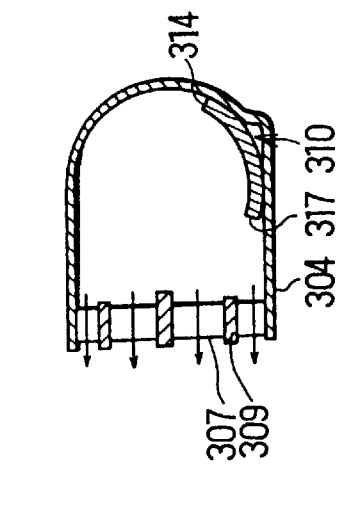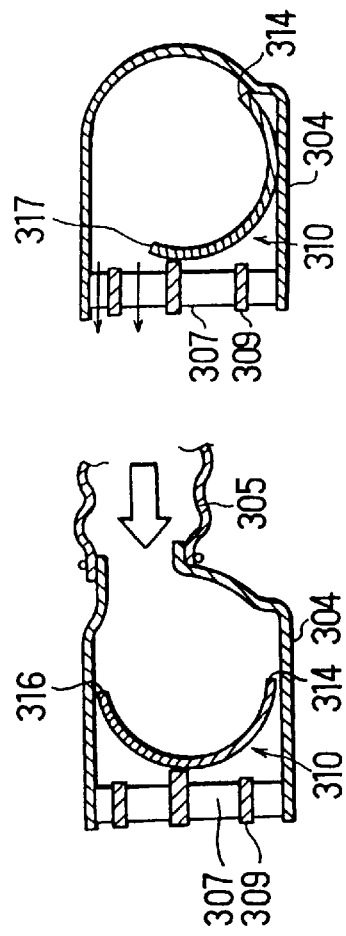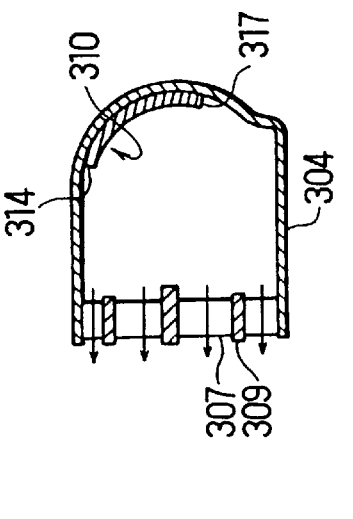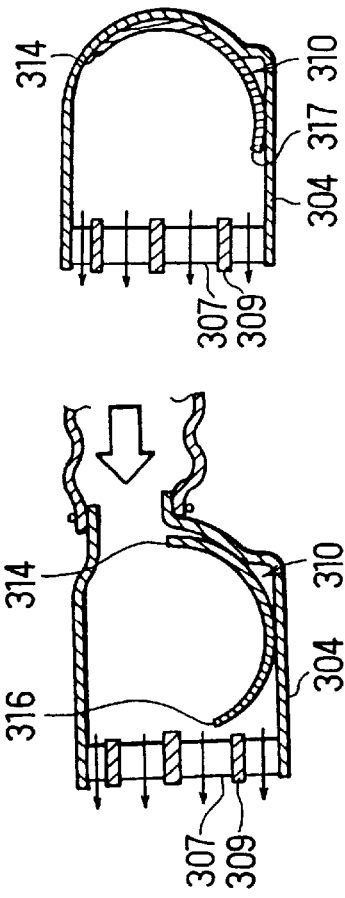

VEHICLE AIR CONDITIONER WITH LOUVER OPERATION CONTROL

BACKGROUND OF THE INVENTION

1. Field of the Invention

The present invention relates to a vehicle air conditioner having an air conditioning unit in which air-blowing state to be blown toward first and second air-conditioning zones of a passenger compartment are independently controlled. More particularly, the present invention relative to a louver operation control for controlling a swing state of louvers of the vehicle air conditioner.

2. Description of Related Art

In a conventional vehicle air conditioner, as shown in FIG. 40, a right center louver 603 on a right-seat side of the vehicle and a left center louver 604 on a left-seat side of the vehicle are disposed in right and left center face air outlets 601, 602, respectively, to be swung in a horizontal direction. The right and left center louvers 603, 604 are controlled to be swung in the same direction in the horizontal direction. Further, the right center louver 603 is controlled to swing in a wide swing range from a right front seat to a left front seat, and the left center louver 604 is controlled to swing in a wide swing range from the left front seat to the right front seat. Thus, temperature of air blown into a passenger compartment is made uniform.

However, in a vehicle where temperature e of air blown toward a right side and temperature of air blown toward a left side in the passenger compartment are independently controlled, when the right and left center louvers 603, 604 are controlled as described above, right-side conditioned air different from left-side conditioned air is blown from the right center face outlet 601 toward the front left-seat side, and left-side conditioned air different from the right-side conditioned air is blown from the left center face outlet 602 toward the front right-seat side. Thus, right-left side independent temperature control cannot be maintained. On the other hand, when a set temperature difference between a right-seat side air-conditioning zone and a left-seat side air-conditioning zone is larger, a temperature difference between air blown from the right center face air outlet 601 and air blown from the left center face outlet 602 becomes larger, and the conditioned air with the different temperature is alternately blown toward rear-seat sides. Further, when the right and left center louvers 603, 604 are swung as described above when sunlight enters toward only one side of the vehicle, a time for which conditioned air is directly blown toward a passenger on the one side rear seat is shorter, and air-conditioning performance for the passenger is deteriorated.

SUMMARY OF THE INVENTION

In view of the foregoing problems, it is an object of the present invention to provide a vehicle air conditioner in which temperature of air blown toward plural air-conditioning zones is accurately independently controlled.

It is an another object of the present invention to provide a vehicle air conditioner in which a set temperature difference for front seat sides is hardly affected to a passenger on a rear seat.

It is a further another object of the present invention to provide a vehicle air conditioner in which air-conditioning performance is improved even when sunlight enters from one side of the vehicle.

It is a further another object of the present invention to provide a vehicle air conditioner having plural air-blowing state chaining units, which has a reduced size and a simple structure while operation state of the plural air-blowing state changing units is looked to be nice.

According to the present invention, a vehicle air conditioner includes an air conditioning unit having a plurality of air outlets for blowing conditioned air toward plural air-conditioning zones in the passenger compartment, and the air conditioning unit is set to independently adjust air state to be blown toward the plural air-conditioning zones. In the vehicle air conditioner, an air-blowing state control unit controls operation state of the air-blowing state changing units, in such a manner that an air conditioning range of at least one air-blowing state changing unit for one air-conditioning zone is restricted at a side proximate to the other air-conditioning zone. Thus, an independent air-state control such as an independent temperature control of the vehicle air conditioner can be accurately performed.

Further, the air-conditioning range of the at least one of the air-blowing state changing units is restricted from a front-seat direction of the one air-conditioning zone to a rear-seat direction of an adjacent air-conditioning zone adjacent to the one air-conditioning zone. Therefore, conditioned air is blown toward a passenger on a front seat in the one air-conditioning zone and a passenger on a rear seat in the adjacent air-conditioning zone, while being not blown toward a passenger on a front seat in the adjacent air-conditioning zone. On the other hand, conditioned air for the one air-conditioning zone, blown toward a rear seat, is mixed with conditioned air for the adjacent air-conditioning zone, blown toward a rear seat. Thus, even when a set temperature of the one air-conditioning zone is greatly different from that of the adjacent air-conditioning zone, the set temperature difference hardly affects a passenger on the rear seat.

Preferably, the operation state of the air-blowing state changing units is controlled based on air-conditioning load including a sunlight amount and a sunlight direction entering into the passenger compartment. Therefore, even when sunlight enters into the passenger compartment from one side, air-conditioning performance can be improved.

Preferably, an actuator for driving and operating the air-blowing state changing units includes plural driving units having number smaller than number of the air-blowing state changing units. Therefore, the structure of the vehicle air conditioner can be made simple, and a size thereof is reduced. Further, the air-blowing state control unit controls the plural driving units to control swing operations of the air-blowing state changing units so that air is blown from at least one of the air outlets to be approximately symmetrical relative to a center line. Therefore, the operation state of the air-blowing state changing units is looked to be nice.

The air-blowing state control unit controls the air-blowing state changing units in such a manner that one of the air-blowing state changing units is operated with first operation patterns each having a first periodicity, the other one of the air-blowing state changing units is operated with second operation patterns each having a second periodicity, and a ratio of the first periodicity to the second periodicity is approximately an integer number. Therefore, operation performance of the air-blowing state changing units is improved.

BRIEF DESCRIPTION OF THE DRAWINGS

Additional objects and advantages of the present invention will be more readily apparent from the following detailed description of preferred embodiments when taken together with the accompanying drawings, in which:

FIG. 15 is a characteristic view showing the correction coefficient relative to a sunlight amount ratio between vehicle right and left sides, according to the first embodiment;

FIG. 16A is a time chart showing an operation pattern of a random swing according to the first embodiment, FIG. 16B is a view showing an example of stop time of the random swing according to the first embodiment;

FIG. 30 is a front view showing a dashboard of a vehicle according to an eighth preferred embodiment of the present invention;

FIG. 31 is a disassemble view showing an air outlet duct, a rotation valve and a louver supporting frame, according to the eighth embodiment;

FIG. 32A, FIG. 32B, FIG. 32C are cross-sectional views showing rotation positions of the rotation valve, respectively, during a spot air outlet mode, according to the eighth embodiment;

FIG. 33A, FIG. 33B, FIG. 33C are cross-sectional views showing rotation positions of the rotation valve, respectively, during a wide air outlet mode, according to the eighth embodiment;

DETAILED DESCRIPTION OF THE PRESENTLY PREFERRED EMBODIMENTS

Preferred embodiments of the present invention will be described hereinafter with reference to the accompanying drawings.

Figure 1:
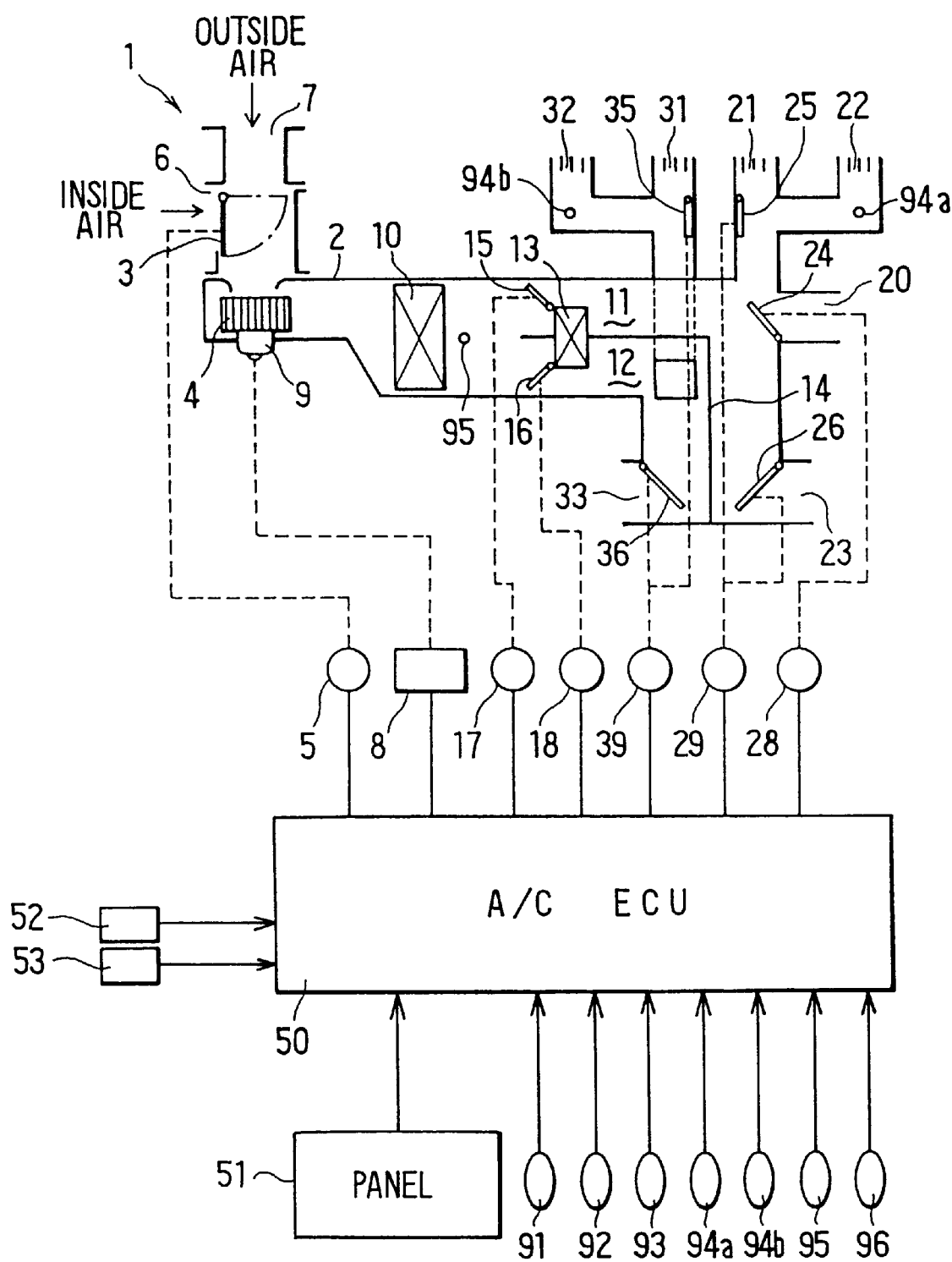
FIG. 1 is a schematic view showing an entire structure of a vehicle air conditioner according to a first preferred embodiment of the present invention.

A first preferred embodiment of the present invention will be now described with reference to FIGS. 1–17. Air-conditioning equipments of an air conditioning unit 1 are controlled by an air-conditioning electronic control unit (ECU) 50, as shown in FIG. 1. In the first embodiment, the present invention is typically applied to the air conditioning unit 1 where a right-seat side air-conditioning zone (area) and a left-seat side air-conditioning zone (area) are independently temperature-controlled.

The air conditioning unit 1 includes an air conditioning duct 2 for defining an air passage. The air conditioning duct 2 is disposed at a front side of a passenger compartment of a vehicle. An inside/outside air switching door 3 and a blower 4 are disposed at an upstream air side of the air conditioning duct 2. The inside/outside air switching door 3 is driven by an actuator such as a servomotor 5 to open and close an inside air suction port 6 and an outside air suction port 7. The blower 4 is driven and rotated by a blower motor 9 controlled by a blower driving circuit 8, so that air flow toward the passenger compartment is generated in the air duct 2.

An evaporator (i.e., cooling heat exchanger) 10 of a refrigerant cycle for cooling air passing through the air conditioning duct 2 is disposed in the air conditioning duct 2 at a downstream side of the blower 4. Further, a heater core (i.e., heating heat exchanger) 13 for heating air passing therethrough is disposed in the air-conditioning duct 2 at a downstream side of the evaporator 10 to cross both first and second air passages 11, 12 of the air conditioning duct 2.

The first and second air passages 11, 12 are partitioned from each other by a partition plate 14. A first air-mixing door 15 for controlling temperature of air blown toward a right-seat side air-conditioning zone (e.g., driver's seat side area) and a second air-mixing door 16 for controlling temperature of air blown toward a left-seat side air-conditioning zone (e.g., front passenger's seat side area next to the driver's seat) are disposed respectively in the first and second passages 11, 12 at an upstream side of the heater core 13, so that temperature adjustments of the right-seat side air-conditioning zone and the left-seat side air-conditioning zone are independently performed. The first and second air-mixing doors 15, 16 are driven by actuators such as servomotors 17, 18, respectively.

On a downstream end side of the first air passage 11, a defroster air outlet 20, a right center face air outlet 21, a right side face air outlet 22 and a right foot air outlet 23 are provided. The defroster air outlet 20 is provided for blowing conditioned air toward a windshield, the right center face air outlet 21 is provided for blowing conditioned air toward an upper side of the right-seat side air-conditioning zone, the right side face air outlet 22 is provided for blowing conditioned air toward a right windshield and an upper side of the right-seat side air-conditioning zone, and the right foot air outlet 23 is provided for blowing conditioned air toward a lower area of the right-seat side air-conditioning zone.

On the other hand, on a downstream end side of the second air passage 12, a left center face air outlet 31, a left side face air outlet 32 and a left foot air outlet 33 are provided respectively. The left center face air outlet 31 is provided for blowing conditioned air toward an upper side of the left-seat side air-conditioning zone, the left side face air outlet 32 is provided for blowing conditioned air toward a left windshield and an upper side of the left-seat side air-conditioning zone, and the left foot air outlet 33 is provided for blowing conditioned air toward a lower side of the left-seat side air-conditioning zone. In the first embodiment, the right-seat side center and side face air outlets 21, 22 correspond to one side air outlet, and the left-seat side center and side face air outlets 31, 32 correspond to the other side air outlet in the present invention.

Further, switching doors 24–26, 35, 36 for respectively opening and closing the air outlets 20, 21, 23, 31, 33 are disposed in the first and second air passages 11, 12, and are driven by actuators such as servomotors 28, 29, 39 to respectively select an air outlet mode on both the right-seat side air-conditioning zone and the left-seat side air-conditioning zone. In the first embodiment, an air outlet mode such as a face mode, a bi-level mode, a foot mode, a foot/defroster mode and a defroster mode can be selected, respectively, for both the right-seat side air-conditioning zone (e.g., driver's seat side) and the left-seat side air-conditioning zone (e.g., front-passenger's seat side).

Figure 2:
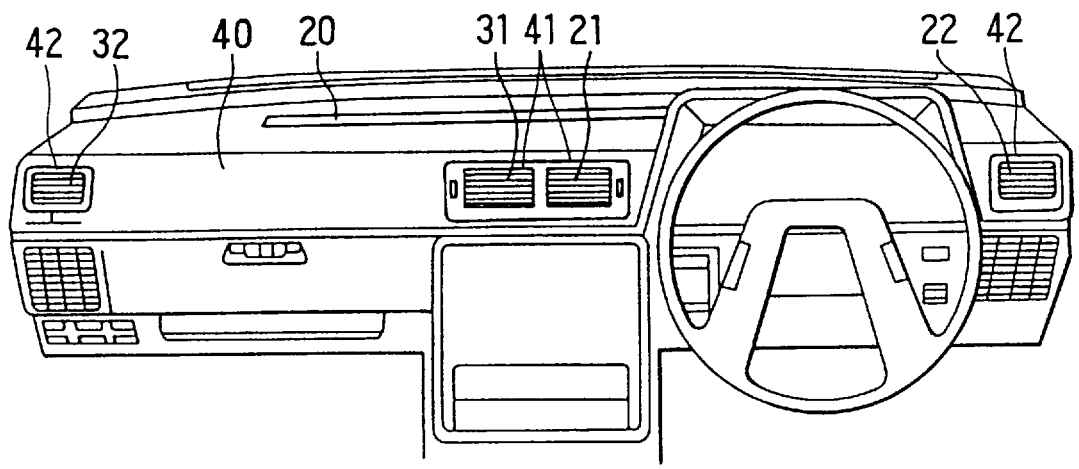
FIG. 2 is a front view showing a dashboard of the vehicle according to the first embodiment.
Figure 3:
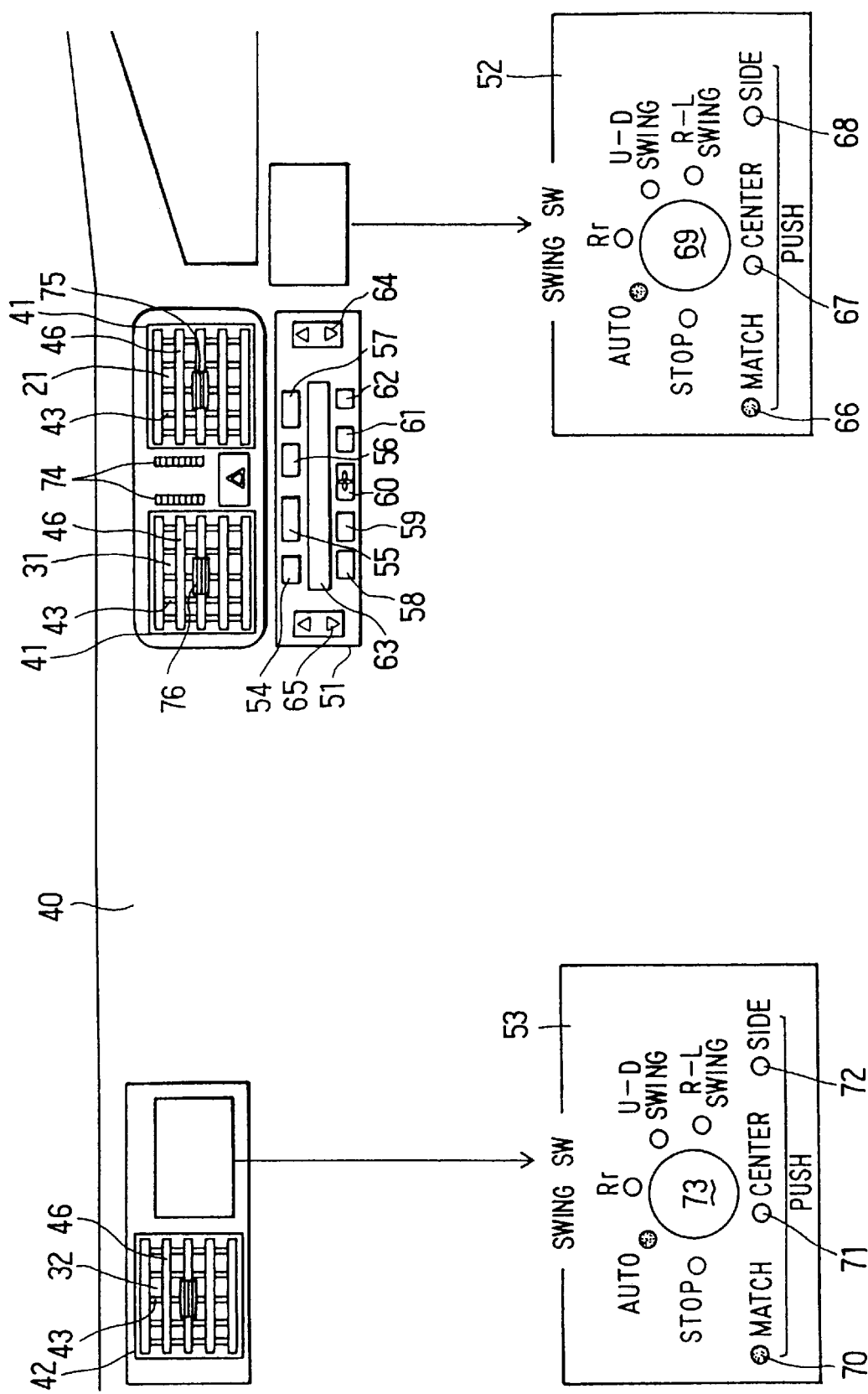
FIG. 3 is a schematic front view showing operation panels of the vehicle according to the first embodiment.

As shown in FIGS. 2, 3, the right and left center face air outlets 21, 31 are defined by a center grill 41, and the right and left side face air outlets 22, 32 are defined by a side grill 42. An air-blowing state changing unit for changing an air-blowing state such as an air-blowing area of conditioned air and an air-blowing direction of conditioned air is disposed in each of the center grill 41 and the side grill 42.

Figure 4:
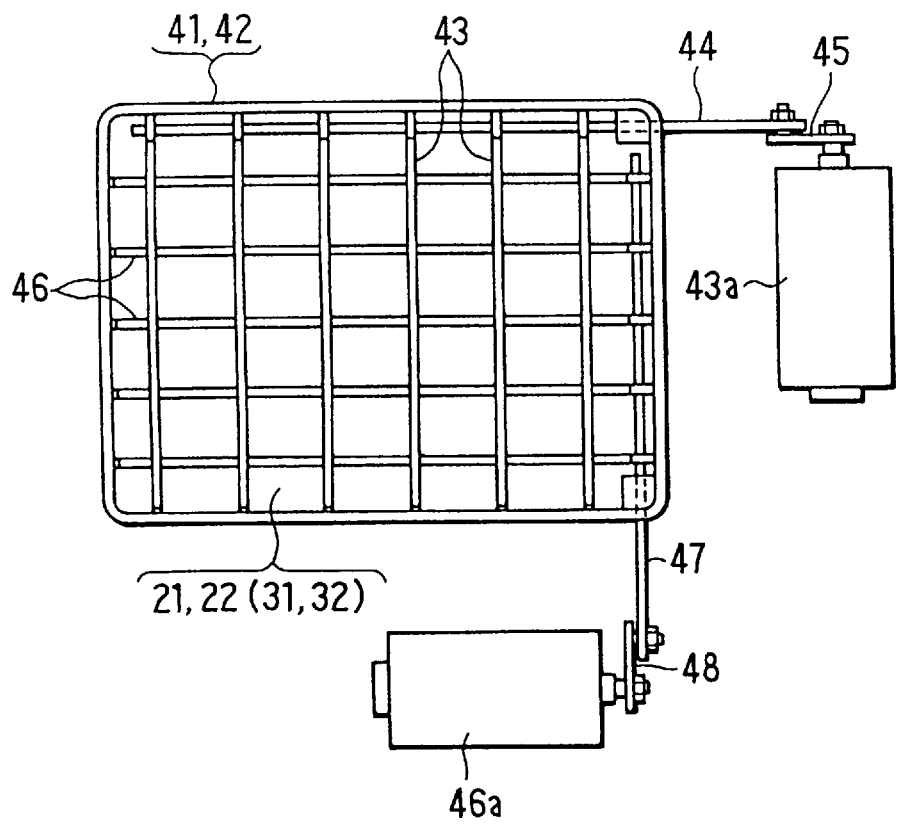
FIG. 4 is a schematic view showing an air-blowing state changing unit according to the first embodiment.

Next, the air-blowing state changing unit disposed in each of the center grill 41 and the side grill 42 will be now described with reference to FIGS. 4–6. FIG. 4 is a schematic view showing the air-blowing state changing unit disposed in each air outlet 21, 22, 31, 32. Here, the structure of the air-blowing state changing unit disposed in each of the left face air outlets 31, 32 is similar to that disposed in each of the right face air outlets 21, 22. The air-blowing state changing unit includes a right-left swing louver mechanism and an up-down swing louver mechanism.

Figure 5:
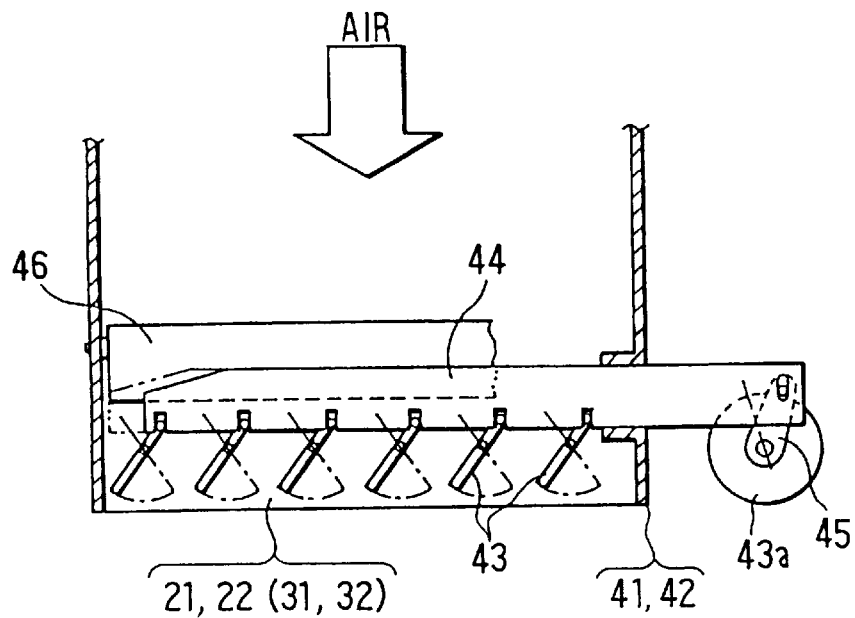
FIG. 5 is a schematic view showing a structure of a right-left swing mechanism according to the first embodiment.

As shown in FIGS. 4, 5, the right-left swing louver mechanism includes plural air-flow direction changing louvers 43, a link lever 44 for swinging the louvers 43 around supporting points, and a stepping motor 43a for reciprocating the link lever 44 in a horizontal direction through an arm plate 45. The louvers 43 are arranged in a vehicle right-left direction (i.e., vehicle width direction). The louvers 43 disposed in each of the center face air outlets 21, 31 are referred to as "center louvers 43", and louvers 43 disposed in each of the side face air outlets 22, 32 are referred to as "side louvers 43".

Figure 6:
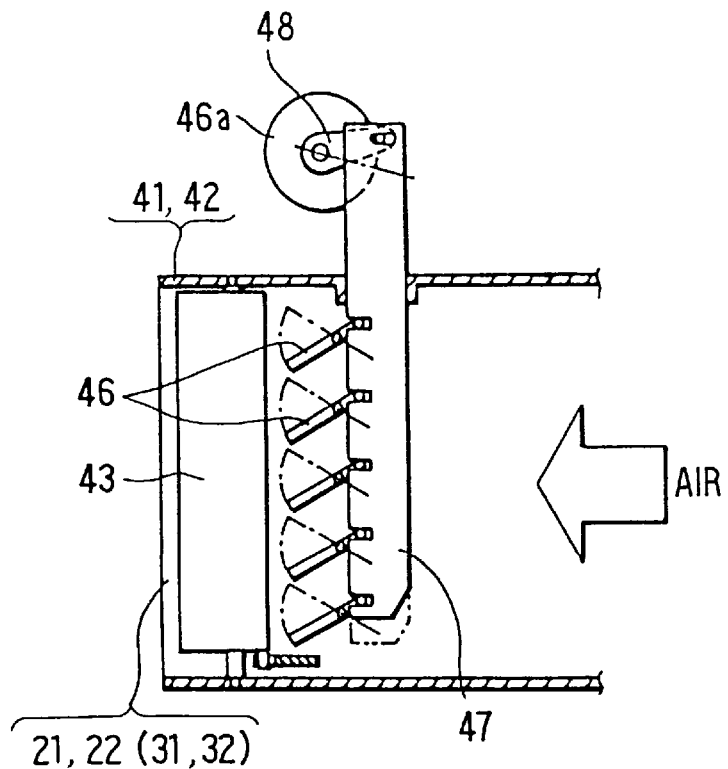
FIG. 6 is a schematic view showing a structure of an up-down swing mechanism according to the first embodiment.

As shown in FIGS. 4, 6, the up-down swing louver mechanism includes plural air-flow direction changing louvers 46, a link lever 47 for swinging the louvers 46 around supporting points, and a stepping motor 46a for reciprocating the link lever 47 in a vertical direction through an arm plate 48. The louvers 46 are arranged in a vehicle up-down direction (i.e., vehicle height direction). The louvers 46 disposed in each of the center face air outlets 21, 31 are referred to as "center louvers 46", and louvers 46 disposed in each of the side face air outlets 22, 32 are referred to as "side louvers 46".

In each of the right and left-seat sides of the passenger compartment, the center and side louvers 43, 46 are respectively swung in a predetermined swing range (e.g., 50°) by rotating the stepping motors 43a, 46a, so that conditioned air is blown toward the right-seat side air-conditioning zone and the left-seat side air-conditioning zone. By stopping the stepping motors 43a, 46a at predetermined rotation angles, respectively, an air-blowing direction toward a passenger on a front right-seat side, a front left-seat side, a rear right-seat side or a rear left-seat side in the passenger compartment can be fixed.

A sliding unit such as a clutch for interrupting passenger's operation force transmitted from the link levers 44, 47 or the arms 45, 48 to output shafts of the stepping motors 43a, 46a is provided between the output shafts of the stepping motors 43a, 46a and the link levers 44, 47 or the arm plates 45, 48. Therefore, when the center and side louvers 43, 46 are operated manually by a passenger, large load is not applied to the stepping motors 43a, 46a.

In each of the step motors 43a, 46a, an operation angle per pulse (Op) is pre-determined. When the center and side louvers 43, 46 are positioned at a predetermined direction or are swung in a predetermined range, a necessary pulse number (Pn) is calculated by the following expression (1) and is output from the ECU 50.

$$Pn=On/Op \tag{1}$$

in which, "On" is a necessary operation angle.

In the first embodiment, the air-blowing state into the passenger compartment is controlled by the ECU 50. The ECU 50 includes a microcomputer in which a CPU, a ROM, a RAM and the like are incorporated. Further, as shown in FIGS. 1, 3, switch signals from an air-conditioning operation panel 51, a right-seat side louver operation panel (SWING SW) 52 and a left-seat side louver operation panel (SWING SW) 53 are input into the ECU 50.

The air-conditioning operation panel 51 is integrally disposed in a dashboard 40 at a center portion in the vehicle width direction on a front surface in the passenger compartment. As shown in FIG. 3, on the air-conditioning operation panel 51, there are provided an air-conditioning (A/C) switch 54, an air-suction mode selecting (R/F) switch 55, a front defroster (Fr DEF) switch 56, a rear defroster (Rr DEF) switch 57, a dual (DUAL) switch 58, an air-outlet mode selecting (MODE) switch 59, an air-blowing amount selecting switch 60, an automatic (AUTO) switch 61, an off switch 62, a display 63, a first temperature setting switch 64 for setting a right-seat side air temperature, and a second temperature setting switch 65 for setting a left-seat side air temperature.

Here, the dual switch 58 is for setting a right-left independent temperature control where the temperature adjustment in the right-seat side air-conditioning zone and the temperature adjustment in the left-seat side air-conditioning zone are respectively independently performed. Temperature in the right-seat side air-conditioning zone is set at a predetermined temperature by the first temperature setting switch 64, and temperature in the left-seat side air-conditioning zone is set at a predetermined temperature by the second temperature setting switch 65.

The right-seat side louver operation panel 52 is disposed around the center portion of the dashboard 40 at an adjacent right side of the air-conditioning operation panel 51. On the right-seat side louver operation panel 52, there are provided a match switch (MATCH) 66 which is set to swing both the center and side louvers 43, 46 on the right-seat side, a center switch (CENTER) 67 which is set to swing the right-seat side center louvers 43, a side switch (SIDE) 68 which is set to swing the side louvers 46 on the right-seat side, and a swing mode selecting switch 69.

Each of the match switch 66, the center switch 67 and the side switch 68 is a push type switch having a normal position (OFF) and a pushed position (ON). The swing mode selecting switch 69 is a rotary type switch having selecting positions of a swing stop position (STOP), an automatic swing position (AUTO), a rear swing position (Rr), an up-down swing position (U-D SWING) and a right-left swing position (R-L SWING).

When the swing mode selecting switch 69 is set at the swing stop position (STOP), the center and side louvers 43, 46 on the right-seat side are not operated. When the swing mode selecting switch 69 is set at the automatic swing position (AUTO), the center and side louvers 43, 46 on the right-seat side are automatically controlled. When the swing mode selecting switch 69 is set at the rear swing position (Rr), the right-seat side center and side louvers 43, 46 are controlled so that an amount of air blown toward the rear-seat side air-conditioning zone becomes larger than an amount of air blown toward the front-seat side air-conditioning zone of the passenger compartment. When the swing mode selecting switch 69 is set at the up-down swing position (U-D SWING), the right-seat side center and side louvers 46 are manually controlled to be swung in the up-down direction in a predetermined swing range. Further, when the swing mode selecting switch 69 is set at the right-left swing position (R-L SWING), the right-seat side center and side louvers 43 are manually controlled to be swung in the right-left direction in a predetermined swing range.

Similarly to the right-seat side louver operation panel 52, the left-seat side louver operation panel 53 is provided with a match switch (MATCH) 70 which is set to swing both the center and side louvers 43, 46 on the left-seat side, a center switch (CENTER) 71 which is set to swing the left-seat side center louvers 43, a side switch (SIDE) 72 which is set to swing the side louvers 46 on the left seat side, and a swing mode selecting switch 73.

Each of the match switch 70, the center switch 71 and the side switch 72 is a push type switch having a normal position (OFF) and a pushed position (ON). The swing mode selecting switch 73 is a rotary type switch having selecting positions of a swing stop position (STOP), an automatic swing position (AUTO), a rear swing position (Rr), an up-down swing position (U-D SWING) and a right-left swing position (R-L SWING).

When the swing mode selecting switch 73 is set at the swing stop position (STOP), the center and side louvers 43, 46 on the right-seat side are not operated. When the swing mode selecting switch 73 is set at the automatic swing position (AUTO), the center and side louvers 43, 46 on the left-seat side are automatically controlled. When the swing mode selecting switch 73 is set at the rear swing position (Rr), the left-seat side center and side louvers 43, 46 are controlled so that an amount of air blown toward the rear-seat side air-conditioning zone becomes larger than an amount of air blown toward the front-seat side air-conditioning zone in the passenger compartment. When the swing mode selecting switch 73 is set at the up-down swing position (U-D SWING), the left-seat side center and side louvers 46 are manually controlled to be swung in the up-down direction in a predetermined swing range. Further, when the swing mode selecting switch 73 is set at the right-left swing position (R-L SWING), the left-seat side center and side louvers 43 are manually controlled to be swung in the right-left direction in a predetermined swing range.

As shown in FIG. 3, a door opening/closing switch 74 for manually operating shutters (not shown) for opening and closing right and left center face air outlets 21, 31 is disposed between the right and left center grills 41. Further, knobs 75, 76 for manually moving a louver direction of each center and side louvers 43, 46 in the right-left direction and in the up-down direction are provided in the right and left center grills 41 and the right and left side grills 42.

Sensor signals from a sensor group are input into the microcomputer of the air-conditioning ECU 50 after performing an A/D variation. The sensor group includes an inside air temperature sensor 91 for detecting temperature of inside air inside the passenger compartment, an outside air temperature sensor 92 for detecting temperature of outside air outside the passenger compartment, a sunlight sensor 93 for detecting a state of sunlight entering into the passenger compartment, right and left blown-air temperature sensors 94a, 94b for detecting temperature of air blown toward the right-seat side air-conditioning zone and temperature of air blown toward the left-seat side air-conditioning zone, a post-evaporator temperature sensor 95 for detecting temperature of air immediately after passing through the evaporator 10, and a water temperature sensor 96 for detecting temperature of cooling water of a vehicle engine. Further, the sunlight sensor 93 includes a right side detector (e.g., photodiode) for detecting a sunlight amount (sunlight intensity) Ts(Dr) irradiated into the right-seat side air-conditioning zone of the passenger compartment, and a left side detector (e.g., photodiode) for detecting a sunlight amount (sunlight intensity) Ts(Pa) irradiated into the left-seat side air-conditioning zone of the passenger compartment.

Figure 7:
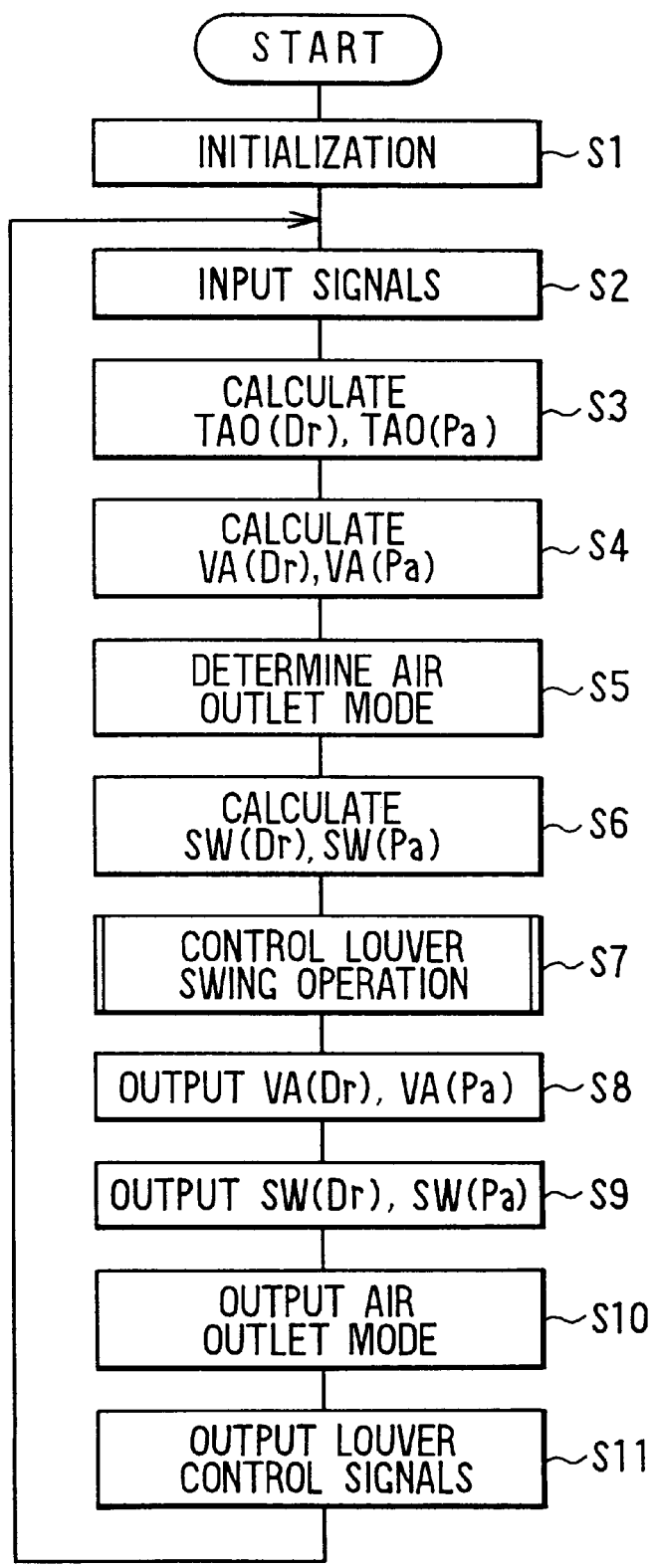
FIG. 7 is a flow diagram of a control program of an air-conditioning ECU according to the first embodiment.
Figure 8:
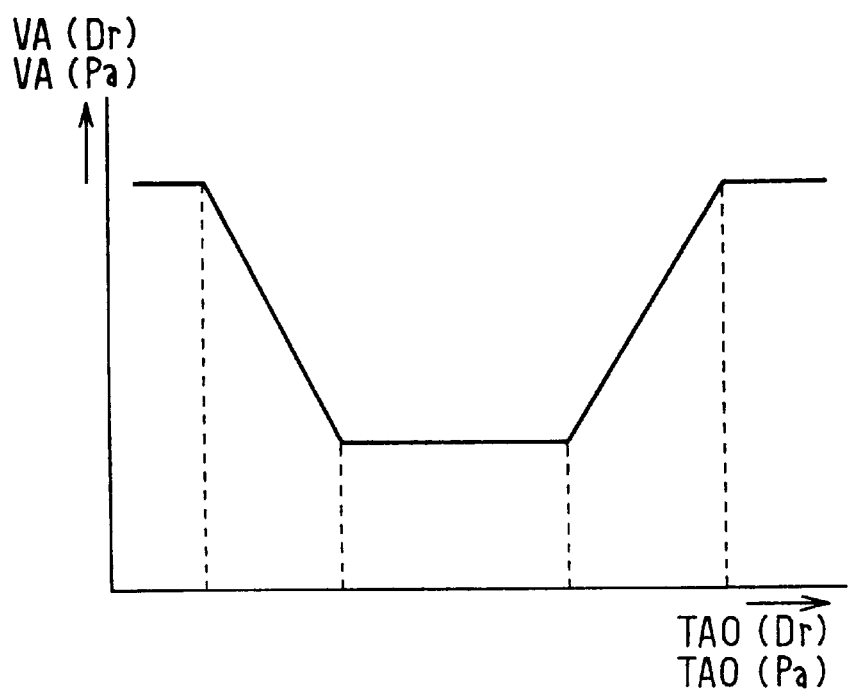
FIG. 8 is a characteristic view showing a blower voltage control relative to a right-seat side target air temperature and a left-seat side target air temperature according to the first embodiment.

Next, a control method of the air-conditioning ECU 50 will be now described. FIG. 7 shows a control program of the air-conditioning ECU 50. As shown in FIG. 7, when an ignition switch of the vehicle is turned on and direct-current electrical power is supplied to the air-conditioning ECU 50, the control routine shown in FIG. 7 starts. First, at step S1, an initialization is performed based on a stored program of the RAM, for example. Next, at step S2, switch signals from switches and sensor signals from the sensor group are input.

Next, at step S3, a right-seat side (driver's seat side) target air temperature TAO(Dr) and a left-seat side (front passenger's seat side) target air temperature TAO(Pa) are calculated based on the following expressions (2) and (3).

$$TAO(Dr) = Kset \cdot Tset(Dr) - KR \cdot TR - KAM \cdot TAM - \\ KS \cdot TS(Dr) + Kd(Dr) \times \\ [CD(Dr) + Ka(Dr) \cdot (10 - TAM)] \times \\ [Tset(Dr) - Tset(Pa)] + C \quad (2)$$

$$TAO(Pa) = Kset \cdot Tset(Pa) - KR \cdot TR - KAM \cdot TAM - \\ KS \cdot TS(Pa) + Kd(Pa) \times \\ [CD(Pa) + Ka(Pa) \cdot (10 - TAM)] \times \\ [Tset(Pa) - Tset(Dr)] + C \quad (3)$$

in which, Tset(Dr) and Tset(Pa) indicate respectively a set temperature within the right-seat side air-conditioning zone and a set temperature within the left-seat side air-conditioning zone, TS(Dr) and TS(Pa) indicate respectively the sunlight amounts (sunlight intensity) entering into the right-seat side and left-seat side air-conditioning zones, TR indicates temperature within the passenger compartment, and TAM indicates the temperature of outside air outside the passenger compartment. Further, Kset, KR, KAM, KS, Kd(Dr) and Kd(Pa) are, respectively, a temperature setting gain, an inside air temperature gain, an outside air temperature gain, a sunlight amount gain, and temperature-difference correction gains between the right-seat side and left-seat side air-conditioning zones. Further, Ka(Dr) and Ka(Pa) indicate gains for correcting relation degrees of outside air temperature (TAM) relative to the right-seat side and left-seat side air-conditioning zones, respectively, CD(Dr) and CD(Pa) indicate 10 constants corresponding to the relation degrees, and "C" indicates a correction constant. Here, Ka(DR). Ka(Pa), CD(Dr), CD(Pa) are a parameter showing a shape or a size of the vehicle, an air-blowing direction of the air conditioning unit 1, and the like.

Next, at step S4, blower voltage VA(Dr), VA(Pa) is calculated based on the right-seat side (driver's seat-side) and left-seat side (front passenger's seat side) target air temperature TAO(Dr), TAO(Pa). Specifically, the blower voltage VA(Dr) and the blower voltage VA(Pa) respectively corresponding to the right-seat side (driver's seat-side) and left-seat side (front passenger's seat side) target air temperature TAO(Dr), TAO(Pa) are obtained based on the characteristic graph shown in FIG. 8, and blower voltage VA applied to the blower motor 9 is calculated by the average of the blower voltage VA(Dr) and the blower voltage VA(Pa).

Figure 9:
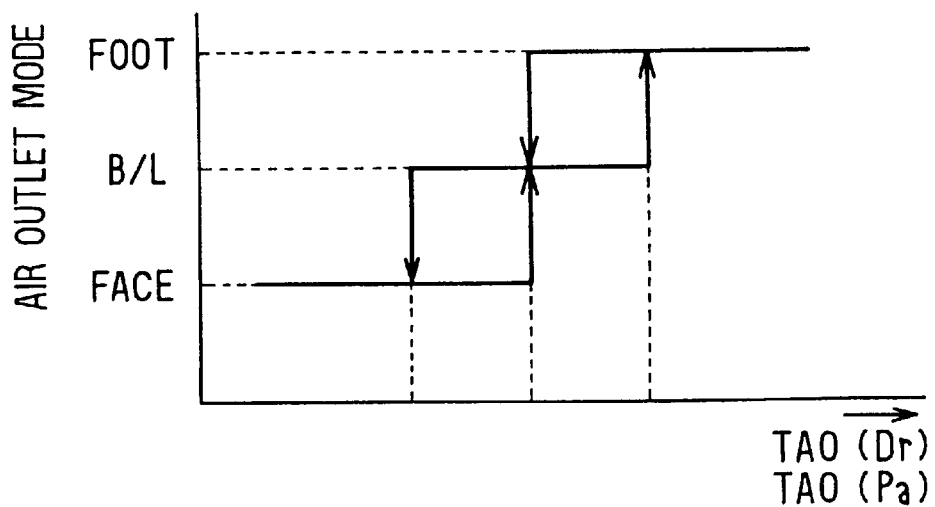
FIG. 9 is a characteristic view of an air outlet mode relative to a right-seat side target air temperature and a left-seat side target air temperature according to the first embodiment.

Next, at step S5, an air outlet mode for the right-seat side (driver's seat-side) air-conditioning zone and an air outlet mode for the left-seat side (front passenger's seat side) air-conditioning zone are determined based on the calculated target air temperature TAO(Dr), TAO(Pa) and the characteristic graph shown in FIG. 9. Specifically, when each target air temperature TAO(Dr), TAO(Pa) is changed from a low temperature to a high temperature, a face mode, a bi-level (B/L) mode or a foot mode is set in this order as the air outlet mode. On the other hand, any one air outlet mode within the face mode, the bi-level mode, the foot mode and a foot/defroster mode is set by the mode selecting switch 59 provided on the air-conditioning operation panel 51.

During the face mode, conditioned air is blown toward the upper side of a passenger on the right-seat side and left-seat side air-conditioning zones. During the bi-level (B/L) mode, conditioned air is blown toward both the upper and lower sides of the passenger on the right-seat side and left-seat side air-conditioning zones. During the foot mode, conditioned air is blown toward the lower side of a passenger on the right-seat side and left-seat side air-conditioning zones. During the foot/defroster (F/D) mode, conditioned air is blown toward the lower side of the passenger on the right-seat side and left-seat side air-conditioning zones and an inner surface of the windshield.

In the first embodiment, when the front defroster switch 56 provided onto the air-conditioning operation panel 51 is operated, a defroster (DEF) mode for blowing conditioned air toward the inner surface of the windshield of the vehicle is set. Further, even when the air outlet mode is the foot mode, the foot/defroster mode or the defroster mode, the right and left side face air outlets 22, 32 are always opened.

Next, at step S6, an opening degree SW(Dr) (%) of the first air-mixing door 15 for the right-seat side and an opening degree SW(Pa) (%) of the second air-mixing door 16 for the left-seat side are calculated. The opening degrees SW(Dr), SW(Pa) of the first and second air-mixing doors 15, 16 are calculated based on the following expressions (4), (5), respectively, by using the right-seat side target air temperature TAO(Dr), the left-seat side target air temperature TAO(Pa), the post-evaporator temperature TE detected by the post-evaporator temperature sensor 95 and the water temperature TW detected by the water temperature sensor 96.

$$SW(Dr)=[TAO(Dr)-TE]\times 100/(TW-TE) \quad (4)$$

$$SW(Pa)=[TAO(Pa)-TE]\times 100/(TW-TE) \quad (5)$$

Next, louver swing operation is controlled at step S7 as shown by the control routine in FIG. 10 described below, and control signals are output to the blower driving circuit 8 at step S8 so that blower voltage of the blower motor 9 becomes the VA(Dr), VA(Pa) calculated at step S4. Next, at step S9, control signals are output to the servomotors 17, 18 so that the opening degrees of the first and second air-mixing doors 15, 16 become the opening degrees SW(Dr), SW(Pa) calculated at step S6. Further, at step S10, control signals are output to the servomotors 28, 29, 39 so that an air outlet mode determined at step S5 is set. Thereafter, at step S11, louver control signals are output to the stepping motors 43a, 46a so that a louver direction (air-blowing direction), an air-blowing position or a swing range determined at step S7 is set.

The louver swing operation of the air-conditioning ECU 50 will be described. FIG. 10 is a sub-flow diagram at step S7 in FIG. 7, showing a control program of the louver swing operation. When the control routine of FIG. 10 starts, it is determined whether or not an automatic (AUTO) swing is set at step S12. That is, at step S12, it is determined whether or not the swing mode selecting switches 69, 73 provided on the right and left side louver operation panels 52, 53 are set at the automatic positions (AUTO). When the swing mode selecting switches 69, 73 are not set at the automatic positions (AUTO), manual louver controls corresponding to the set positions of the swing mode selecting switches 69, 73 are performed at step S13, and thereafter the control routine of FIG. 10 is finished.

On the other hand, when the automatic swing is set at step S12, automatic louver controls are performed. First, at step S14, it is determined whether or not the air outlet mode is the face mode or the bi-level mode. When the air outlet mode is not the face mode or the bi-level mode, the swing operation of the right and left center louvers 43, 46 are stopped, and louver directions of the right and left side louvers 43, 46 are determined so that the right and left side louvers 43, 46 are toward side windshields adjacent the right and left side louvers 43, 46. Thereafter, the control routine of FIG. 10 is finished. In the first embodiment of the present invention, the determination at step S14 is performed for each of the right-seat side air-conditioning zone and the left-seat side air-conditioning zone, so that the swing operation of the center and side louvers 43, 46 can be accurately controlled for both the right-seat side air-conditioning zone and the left-seat side air-conditioning zone.

Figure 10:
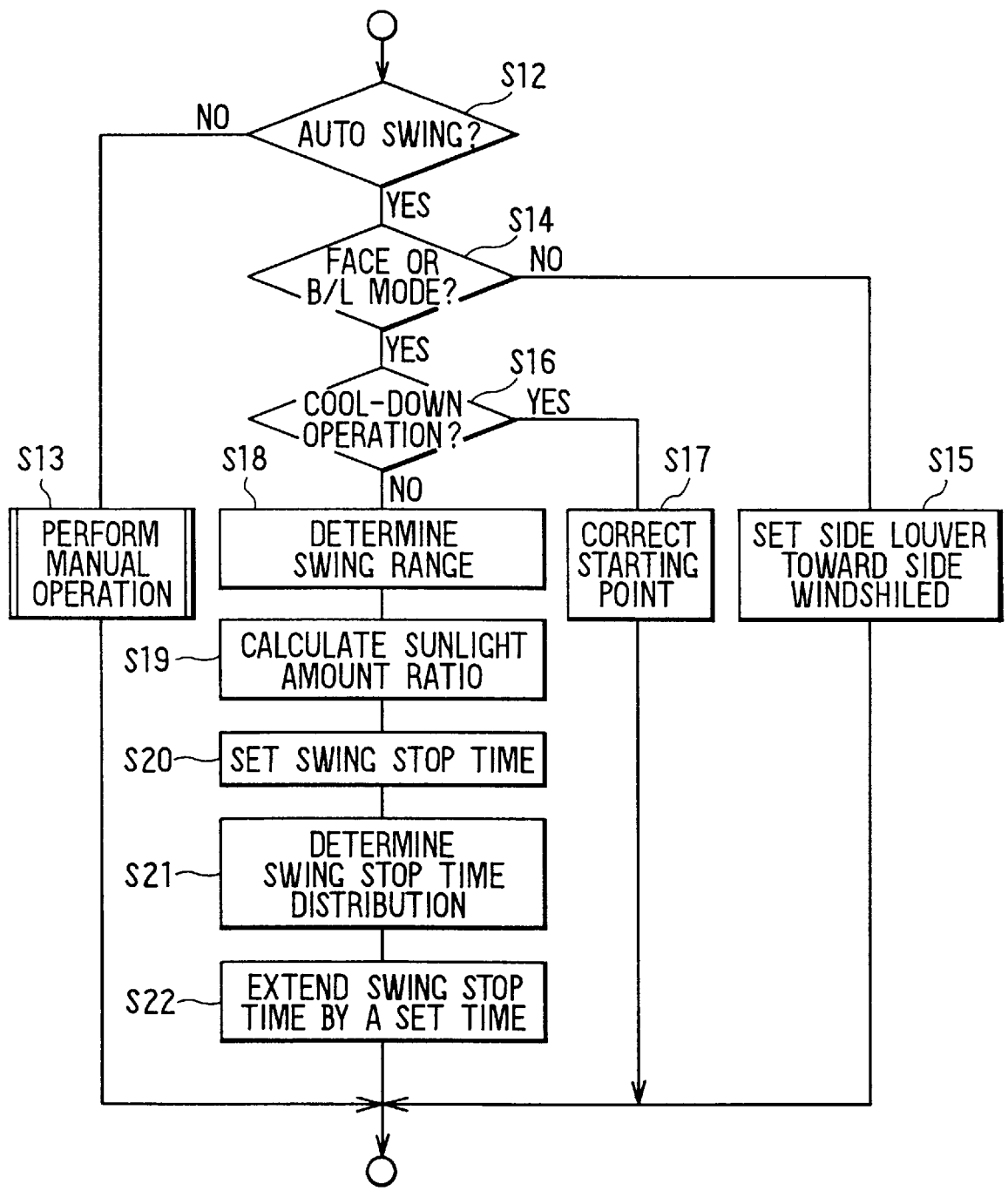
FIG. 10 is a flow diagram showing a swing louver control of the air-conditioning ECU according to the first embodiment.
Figure 11:
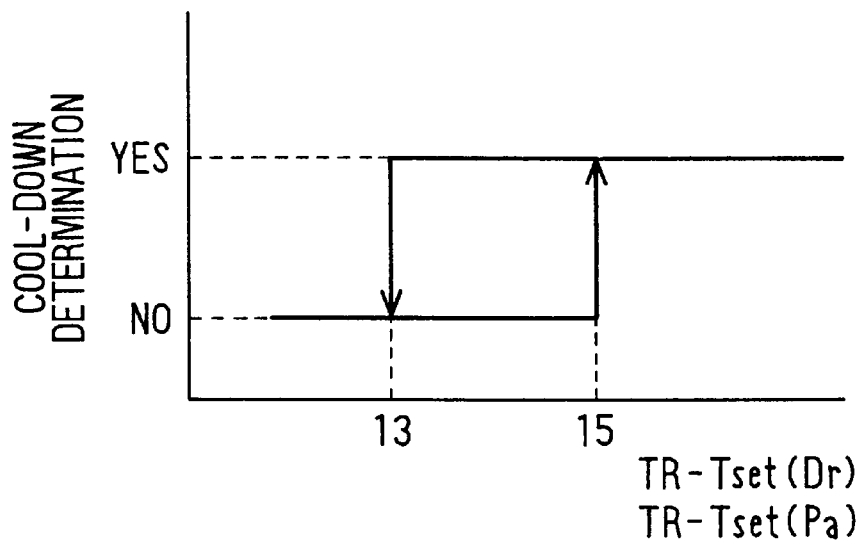
FIG. 11 is a characteristic view of the air-conditioning ECU for determining a cool down state, according to the first embodiment.

When the face mode or the bi-level (B/L) mode is set at step S14, a determination of cool-down operation is performed at step S16 based on the characteristic graph in FIG. 11. That is, when a temperature difference between the inside air temperature TR inside the passenger compartment and the right or left side set temperature Tset(Dr), Tset(Pa) is larger than a first predetermined temperature (e.g., 15° C.), the cool-down operation is determined, and starting point corrections of the right and left center louvers 43, 46 and the right and left side louvers 43, 46 are performed at step S17. Further, at step S17, control signals are output to the stepping motors 43a, 46a so that louver directions are set to be toward the passenger in the passenger compartment in accordance with a passenger's seat position. Thereafter, the control routine of FIG. 10 is finished.

That is, the starting point corrections of the right and left center louvers 43, 46 and the right and left side louvers 43, 46 are performed by outputting control signals to the stepping motor 43a, 46a so that louvers 43, 46 firstly contact swing ends in louver-starting point correction direction. The louver positions contacting the swing ends in the louver-stating point correction direction are used as the starting point. Further, the stepping motors 43a, 46a are operated with a small pulse when a seat position is set at a vehicle front side, and are operated with a large pulse when the seat position is set a vehicle rear side, so that the louver directions of the center and side louvers 43, 46 are respectively set to be toward the passenger on the front right seat and the front left seat, as shown in FIG. 12.

Figure 12:
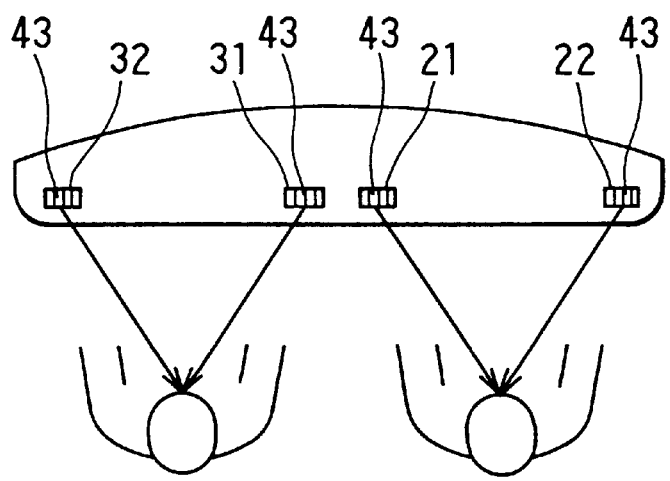
FIG. 12 is a view for explaining a correction direction of a louver starting point according to the first embodiment.

In the first embodiment, the starting point corrections are performed by setting the center and side louvers 43, 46 at the swing ends in louver-starting point correction direction shown in FIG. 12, because a potentiometer for detecting each present position of the right and left center louvers 43, 46 and the right and left side louvers 43, 46 is not provided. Thus, even when the potentiometer is not provided, the louver direction (air-blowing direction) can be accurately set to be toward the passenger. Further, because the louvers 43 contact the swing ends in the louver-starting point correction direction during the starting point correction, time for correcting the stating point can be made shorter, and conditioned air is quickly supplied to the passenger.

A potentiometer for detecting a front seat position on which a passenger is seated may be provided around the front seat. The potentiometer may be set on a switch or the display by a passenger, or may be set by a dealer, so that the louver direction can be suitably set during the cool-down operation.

Figure 13:
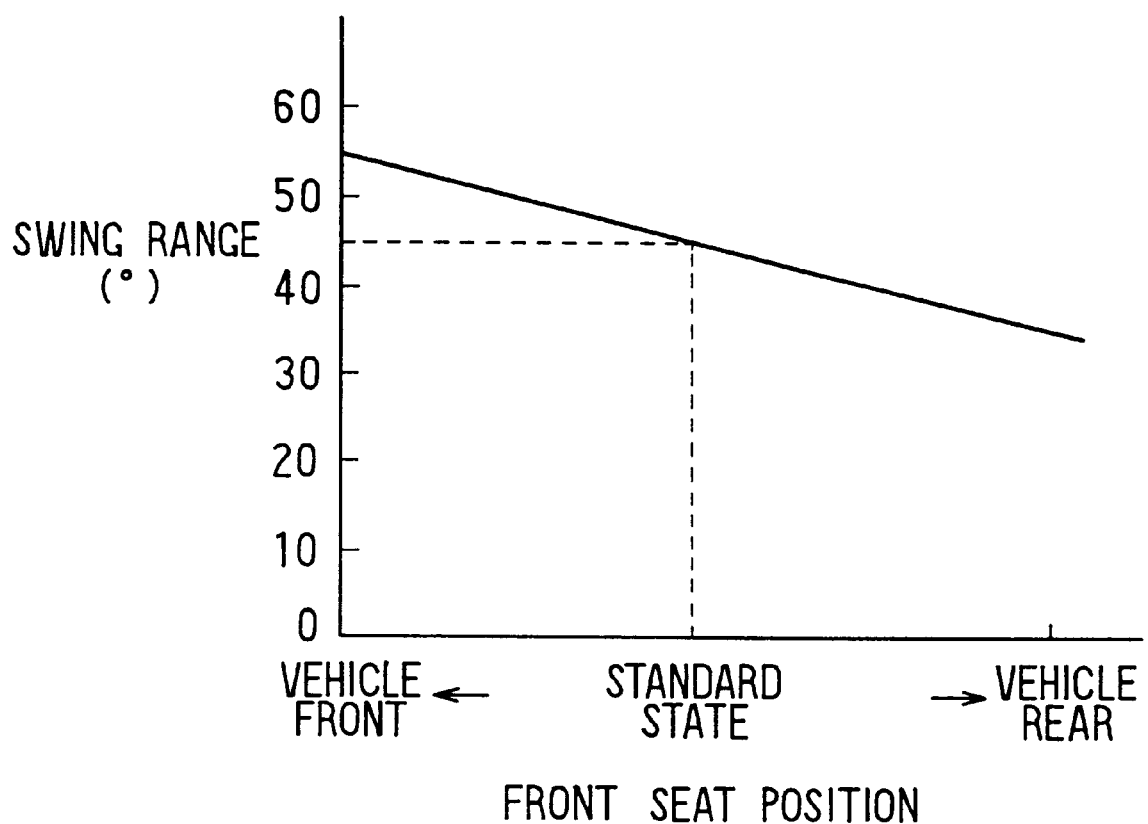
FIG. 13 is a characteristic view showing a relationship between a front seat position and a swing range of louvers, according to the first embodiment.

On the other hand, at step S16 in FIG, 10, when the cool-down operation is not determined, swing ranges of the center and side louvers 43, 46 on the right and left seat sides are calculated based on the air outlet mode, an air amount blown from the face air outlet, the characteristic graph shown in FIG. 13 and a preset air-conditioning range, at step S18. The air-conditioning range is a range of air directly blown from the face air outlet.

Figure 14A:
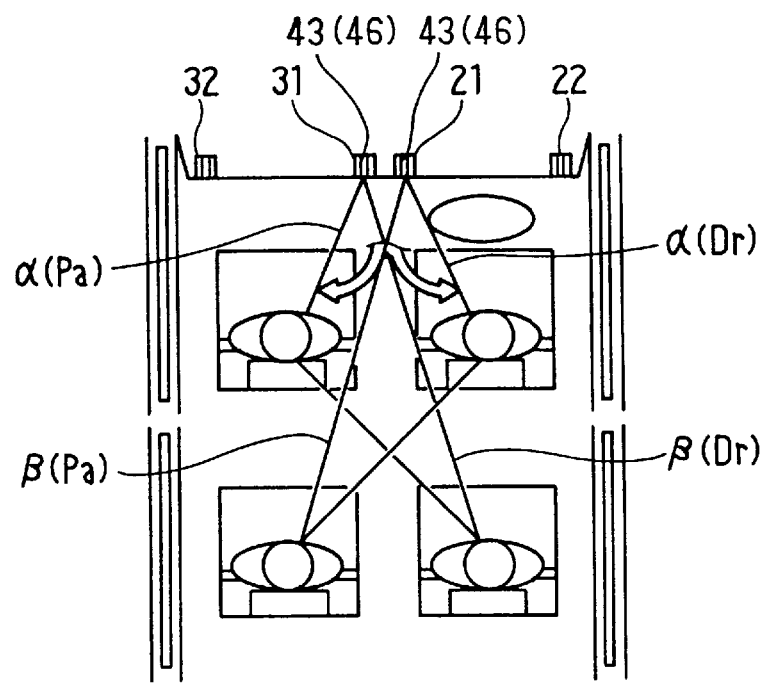
FIG. 14A is a view for explaining a louver swing range of conditioned air blown into a passenger compartment during a normal state.

As shown in FIG. 14A, an air-conditioning range due to the swings of each right center louver 43 is restricted in a range from a direction α(Dr) to a direction β(Pa). Further, an air-conditioning range due to the swings of each left center louver 43 is restricted in a range from a direction α(Pa) to a direction β(Dr). Here, the direction α(Dr) is a swing end of the right center louvers 43 toward the passenger on the right front seat, the direction α(Pa) is a swing end of the left center louvers 43 toward the passenger on the left front seat, the direction β(Dr) is a swing end of the right center louvers 43 toward the passenger on the right rear seat, and the direction β(Pa) is a swing end of the right center louvers 43 toward the passenger on the left rear seat.

Next, at step S19 in FIG. 10, a sunlight amount ratio (H) between right and left sides of the vehicle is calculated based on the following expression (6) and the sunlight amounts TS(Dr), TS(Pa) input at step S2 in FIG. 7.

$$H=TS(Dr)/[TS(Dr)+TS(Pa)] \qquad (6)$$

Here, when a total of the TS(Dr) and the TS(Pa) is equal to or lower than 150 W/m$^2$, the sunlight amount ratio H between right and left sides of the vehicle is set at 0.5 (i.e., H=0.5).

Next, at step S20 in FIG. 10, a swing stop time corresponding to the swing ranges of the center and side louvers 43, 46 on the right and left seat sides is set at the swing ends. In the first embodiment, the swing stop time is set to 7 seconds, for example.

Next, at step S21, a swing stop time distribution is performed so that the swing stop time is distributed between the swing end on the front right-seat side and the swing end on the rear left-seat side or the swing stop time is distributed between the swing end on the front left-seat side and the swing end on the rear right-seat side, by using the sunlight amount ratio H.

Thereafter, at step S22 in FIG. 10, the swing stop time at each swing end extends by a set time. For example, the swing stop time at each swing end extends at least by 1 second. Thereafter, the control routine in FIG. 10 is finished. Thus, the swing stop time at a swing end except for the swing ends on the front right-seat side and the front left-seat side does not becomes zero.

Next, operation of the vehicle air conditioner according to the first embodiment of the present invention will be now described.

When the face mode is set, inside air sucked from the inside air suction port 6 or outside air sucked from the outside air suction port 7 is blown toward the evaporator 10 by the blower 4, and is cooled in the evaporator 10 until a predetermined temperature (e.g., 4° C.). Thereafter, cooled air having been cooled in the evaporator 10 flows into the first and second air passages 11, 12. In the first and second air passages 11, 12, an air amount passing through the heater core 13 and an air amount bypassing the heater core 13 are adjusted by the first and second air mixing doors 15, 16, respectively. Therefore, temperature of air flowing through the first air passage 11 and temperature of air flowing through the second air passage 12 are respectively controlled by the first and second air-mixing doors 15, 16. Thereafter, conditioned air in the first air passage 11 is blown from the right-seat side center and side face air outlets 21, 22 toward the right-seat side air-conditioning zone in accordance with the swing ranges of the center and side louvers 43, 46 on the right-seat side. Specifically, conditioned air in the first air passage 11 is blown toward the upper side of a passenger on the front right seat and the upper side of a passenger on the rear left seat.

On the other hand, conditioned air in the second air passage 12 is blown from the left-seat side center and side face air outlets 31, 32 toward the left-seat side air-conditioning zone in accordance with the swing ranges of the center and side louvers 43, 46 on the left-seat side. Specifically, conditioned air in the second air passage 12 is blown toward the upper side of a passenger on the front left seat and the upper side of a passenger on the rear right seat.

In this case, any one of the swing mode selecting switch 69, 73 is set at the automatic (AUTO) position, target swing ranges of the side louvers 43, 46 on the right and left seat sides is calculated in accordance with the air amount blown from the face air outlets, the characteristic graph shown in FIG. 13 and front right-seat side swing end α(Dr) and the front left-seat side swing end α(Pa). As shown in FIG. 14A, the swing range (air-conditioning range) of the right-seat side center louvers 43 is restricted from the front right-seat side swing end α(Dr) to the rear left-seat side swing end β(Pa). Further, the swing range (air-conditioning range) of the left-seat side center louvers 43 is restricted from the front left-seat side swing end α(Pa) to the rear right-seat side swing end β(Dr). The characteristic graph shown in FIG. 13 can be corrected based on a seat arrangement in the vehicle, the position arrangement of the face air outlets 21, 22, 31, 32 and the opening degree of the face air outlets 21, 22, 31, 32. Further, the swing range of the louvers 43, 46 may be corrected by a passenger's request. In the first embodiment, for simply setting the center and side louvers 43, 46, the swing ranges of the right and left side louvers 43, 46 are made equal to the swing range of the right and left center louvers 43, 46, respectively.

The front right-seat side swing end α(Dr) indicates a swing end position calculated from at least one of conditions such as a front right-seat position, a front right-seat size, the body size of the passenger on the front right seat, an air-conditioning request of the passenger and a position of the passenger. Similarly, front left-seat side swing end α(Pa) indicates a swing end position calculated from at least one of conditions such as a front left-seat position, a front left-seat size, the body size of the passenger on the front left seat, an air-conditioning request of the passenger and a position of the passenger.

For example, as an air-flow position from the right and left center louvers 43, 46 becomes more front side, each swing range of the right and left center louvers 43, 46 is corrected to be wider. Conversely, as the air-flow position from the right and left center louvers 43, 46 becomes more rear side, each swing range of the right and left center louvers 43, 46 is corrected to be narrower.

In the first embodiment, assuming that the passenger on the rear right seat and the passenger on the rear left seat are positioned at the standard states, the rear right-seat side swing end β(Dr) and the rear left-seat side swing end β(Pa) are fixed. However, similarly to the front-seat side swing ends α(Dr),α(Pa), each of the rear right-seat side swing end β(Dr) and the rear left-seat side swing end β(Pa) can be corrected from at least one of conditions such as a rear seat position, a rear seat size, the body size of the passenger on the rear seat, an air-conditioning request of the passenger and a position of the passenger.

In the first embodiment, when the center louvers 43, 46 are directly manually operated by a passenger on the front seat, the swing range may be set to be shifted toward the passenger's operation side. When a swing mode is set by the manual operation of the passenger so that the center louvers 43, 46 are swung between the front right-seat side and the front left-seat side, the determined swing ranges corresponding to the air-conditioning ranges of the present invention is released. That is, the determined swing ranges are released according to the manual operation of the passenger, so that a suitable swing range is reset by the passenger.

Further, when the air-conditioning is preferentially performed for the driver's seat or when the air-conditioning is preferentially performed for the front passenger's seat or the rear seat, the determined swing ranges may be released. Therefore, it is possible to quickly perform the air-conditioning for a predetermined seat position. Further, when air-conditioning capacity is insufficient at a side of the passenger compartment when sunlight enters from one side, conditioned cool air may be blown from a face air outlet for the other air-conditioning zone.

When the starting point is corrected when an air-conditioning operation is started or an air-blowing state is changed, the right and left center louvers 43, 46 may be swung for the other air-conditioning zone. The correction of the starting point of the right and left center louvers 43, 46 may be performed after a predetermined time passes after the operation of the right and left center louvers 43, 46 starts. Further, the correction of the starting point of the right and left center louvers 43, 46 may be performed, after air-conditioning operation is finished, or after the operation of the louvers 43, 46 is finished. Further, the correction of the starting point of the right and left center louvers 43, 46 may be performed at a predetermined time.

In the first embodiment, the swing stop time for which the center and side louvers 43, 46 on both right and left seat sides are temporarily stopped is determined in accordance with the swing range. For example, the swing stop time is set to 7 seconds. Thereafter, the distribution of the swing stop time for the front-seat side end and the rear-seat side end is determined by using the right and left sunlight amount ratio (H). The distribution of the swing stop time is calculated using the following expressions (7)–(10) and the characteristic graph shown in FIG. 15. That is, the swing stop time at a side swing end where sunlight enters is made larger, so that cool air is preferentially supplied to the air-conditioning zone at the side where sunlight enters.

$$TDr1=KDr1\times 7(\text{sec}) \tag{7}$$

in which, TDr1 is a swing stop time at the front right-seat side end, and KDr1 is a distribution ratio of the swing stop time for the front right-seat side end.

$$TPa2=KPa2\times 7(\text{sec}) \tag{8}$$

in which, TPa2 is a swing stop time at the rear left-seat side end, and KPa2 is a distribution ratio of the swing stop time for the rear left-seat side end.

$$TPa1=KPa1\times 7(\text{sec}) \tag{9}$$

in which, TPa1 is a swing stop time at the front left-seat side end, and KPa1 is a distribution ratio of the swing stop time for the front left-seat side end.

$$TDr2=KDr2\times 7(\text{sec}) \tag{10}$$

in which, TDr2 is a swing stop time at the rear right-seat side end, and KDr2 is a distribution ratio of the swing stop time for the rear right-seat side end.

In the above-described first embodiment, the swing stop time is set at a predetermined time, for example, 7 seconds. However, the swing stop time may be a random stop time (T) having random performance, as shown in FIGS. 16A, 16B. FIG. 16B is a random list showing an example of the random stop time. Further, both of a first random list when the air-conditioning load is high and a second random list when the air-conditioning load is low may be used. When a total swing stop time To is increased, a time for which the passenger is in the swing range of the right and left center louvers 43, 46 can be increased, and air-conditioning effect is improved. In this case, even when a time for moving the right and left center louvers 43, 46 from one swing end to the other swing end is made shorter, the time for which the passenger is in the swing range of the right and left center louvers 43, 46 can be increased. Further, when the air-conditioning load is high, the time for which passenger is in the swing range of the right and left center louvers 43, 46 is made longer by increasing the total swing stop time, and air-conditioning effect is improved.

Figure 17:
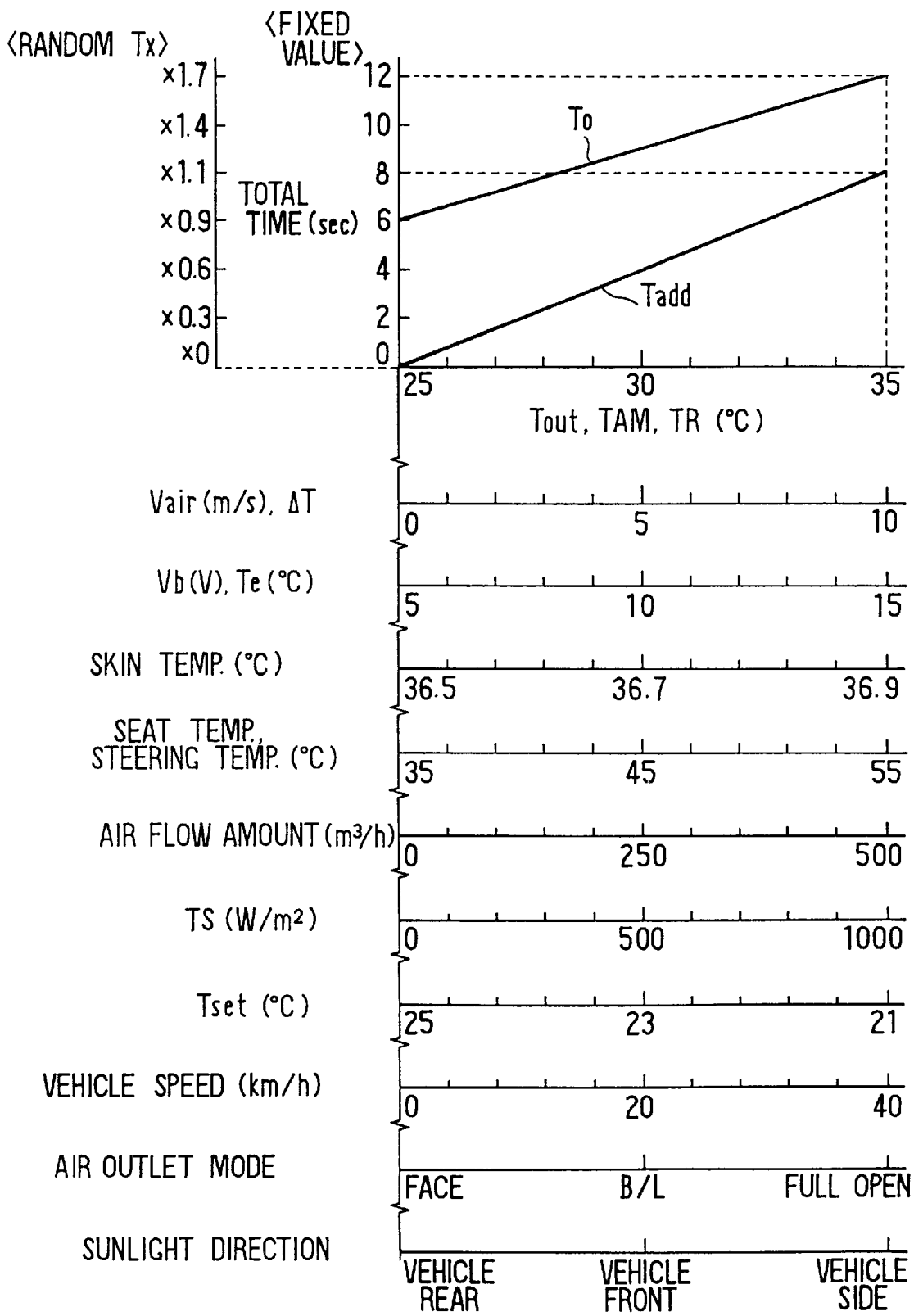
FIG. 17 is a characteristic view showing the relationship between a total stopping time of louver swing and each parameter of air-conditioning load, according to the first embodiment.

As shown in FIG. 17, when the total swing stop time is a fixed value, the total swing stop time To at the front right-seat side end and the rear left-seat side end of the right center louvers 43, 46 or the front left-seat side end and the rear right-seat side end of the left center louvers 43, 46 is set longer as the temperature Tout of air blown into the passenger compartment, the outside air temperature TAM or the inside air temperature TR becomes higher. The total swing stop time To is set to become longer as the air flow speed Vair blown into the passenger compartment becomes higher or a temperature difference ΔT between the inside air temperature TR inside the passenger compartment and the set temperature Tset becomes larger. Further, the total swing stop time To is set to become longer as the blower voltage Vb applied to the blower 4 becomes larger or the post-evaporator temperature Te of air becomes higher.

Further, as shown in FIG. 17, the total swing stop time To is set to become longer as the skin temperature of the passenger, a seat temperature or a steering temperature becomes higher. The total swing stop time To is set to become longer as the air flow amount or the sunlight amount TS becomes larger. On the other hand, the total swing stop time To is set to become longer as the set temperature Tset becomes lower. Further, the total swing stop time To is set to become longer as the vehicle speed becomes faster. As the air outlet mode is changed from the face mode to the bi-level (B/L) mode, the total swing stop time To is set to become longer. Further, as the air outlet mode is changed from the bi-level mode to a fully opened mode, the total swing stop time To is set to become longer.

Further, when sunlight (solar radiation) readily enters toward the front seat from the front windshield as compared with the rear seat, the front seat is preferentially air-conditioned for a safe driving. Therefore, the total swing stop time To is set to become longer for the front seat. Further, the total swing stop time To is set to become further longer for the side seat, when sunlight readily enters toward the side seat from the side windshield, as compared with the case of the front seat. However, when it is necessary to preferentially quickly cool the rear seat, the time Tadd which is added for the front seat is also added to the swing stop time for the rear seat.

When the bi-level mode is set as the air outlet mode, the air flow amount from the face air outlets 21, 22, 31, 32 is decreased by 60% as compared with the face mode because air is also blown from the foot air outlets 23, 33 during the bi-level mode. Therefore, as shown in FIG. 17, during the bi-level mode, the total swing stop time To becomes longer than that during the face mode, so that the right and left center louvers 43, 46 are positioned to be toward the passenger in a long time during the bi-level mode.

Further, when the fully open mode is set, the all air outlets are opened, and the air flow amount blown from the face air outlets 43, 46 is further reduced. Therefore, during the fully open mode, the total swing stop time To is set to be sufficiently long. Even during the fully opened mode, because the air flow amount from the center and side face air outlets 21, 22 on the right-seat side and the air flow amount from the center and side face air outlets 31, 32 on the left-seat side are calculated to correspond to the air-conditioning load of the passenger compartment, such as the outside air temperature and the sunlight amount, air-conditioning for the passenger in the passenger compartment is not deteriorated. Further, when the swing stop time is the random time as shown in FIGS. 16A, 16B, the random time is corrected as shown by Tx in FIG. 17.

In the above-described first embodiment of the present invention, the swing stop time for which the right and left center louvers 43, 46 are temporarily stopped is set. However, a time for which the right and left center louvers 43, 46 are greatly slowly swung, or a range in which the right and left louvers 43, 46 are greatly slowly swung may be set. As described above, in the above described embodiment, the swing stop time within the swing range is controlled in accordance with the air-conditioning load. However, a slowly swing range, a slowly swing degree and a slowly swing time may be changed in accordance with the air-conditioning load. Even in this case, the same effect as the first embodiment can be obtained. Further, when the sunlight enter from the one side, the swing stop time or the slowly swing range or the slowly swing time may be increased in the side louvers 43, 46, as compared with the center louvers 43, 46.

According to the first embodiment of the present invention, in the vehicle air conditioner having the air conditioning unit 1 where the temperature adjustments are independently performed between the right-seat side air-conditioning zone and the left-seat side air-conditioning zone within the compartment, the swing range of the right center louvers 43 is restricted between the front right-seat side swing end α(Dr) and the rear left-seat side swing end β(Pa), so that air is not blown from the right center air outlet 21 toward the passenger on the front left seat. On the other hand, the swing range of the left center louvers 43 is restricted between the front left-seat side swing end α(Pa) and the rear right-seat side swing end β(Dr), so that air is not blown from the left center air outlet 31 toward the passenger on the front right seat. That is, conditioned air is blown toward the passenger on the front seat of a first air-conditioning zone and the passenger on the rear seat of a second air-conditioning zone adjacent to the first air-conditioning zone, while conditioned air is not blown toward the passenger on the front seat of the second air-conditioning zone. Thus, right-left independent temperature control performance can be improved in the air conditioning unit 1.

Further, as shown in FIG. 14A, conditioned air blown from the right center face air outlet 21 toward the rear left seat and conditioned air blown from the left center face air outlet 31 toward the rear tight seat are crossed around on a center console box to be mixed to each other. Therefore, even when the set temperature for the front right-seat side air-conditioning zone and the set temperature for the front left-seat side air-conditioning zone are greatly different from each other, the large set-temperatures different between the front right seat and the front left seat hardly affects the air-conditioning state for the passenger on the rear right seat or the rear left seat.

Figure 14B:
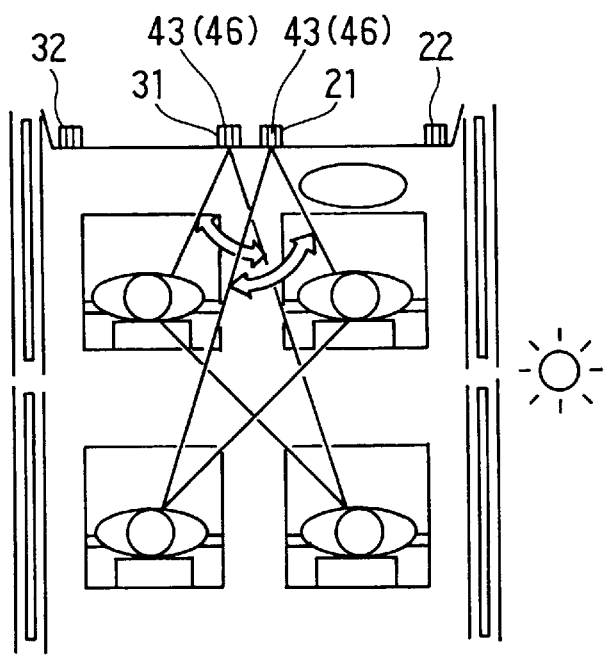
FIG. 14B is a view for explaining the louver swing range of conditioned air blown into the passenger compartment when sunlight enters into the passenger compartment from one side, according to the first embodiment.

Further, as shown in FIG. 14B, when sunlight enters from one side of the vehicle so that sunlight is shined toward the front right seat side, the swing stop time at the front right-seat side swing end of the right center louvers 43 is made longer than the swing stop time at the rear left-seat side swing end of the right center louvers 43. Further, when sunlight enters from one side of the vehicle so that sunlight is shined toward the rear right seat side, the swing stop time at the rear right-seat side swing end of the left center louvers 43 is made longer than the swing stop time at the front left-seat side swing end of the left center louvers 43. Thus, it prevents a decrease of the air-conditioning performance of the front right-seat side and the rear right-seat side toward which sunlight is shined.

Figure 18:
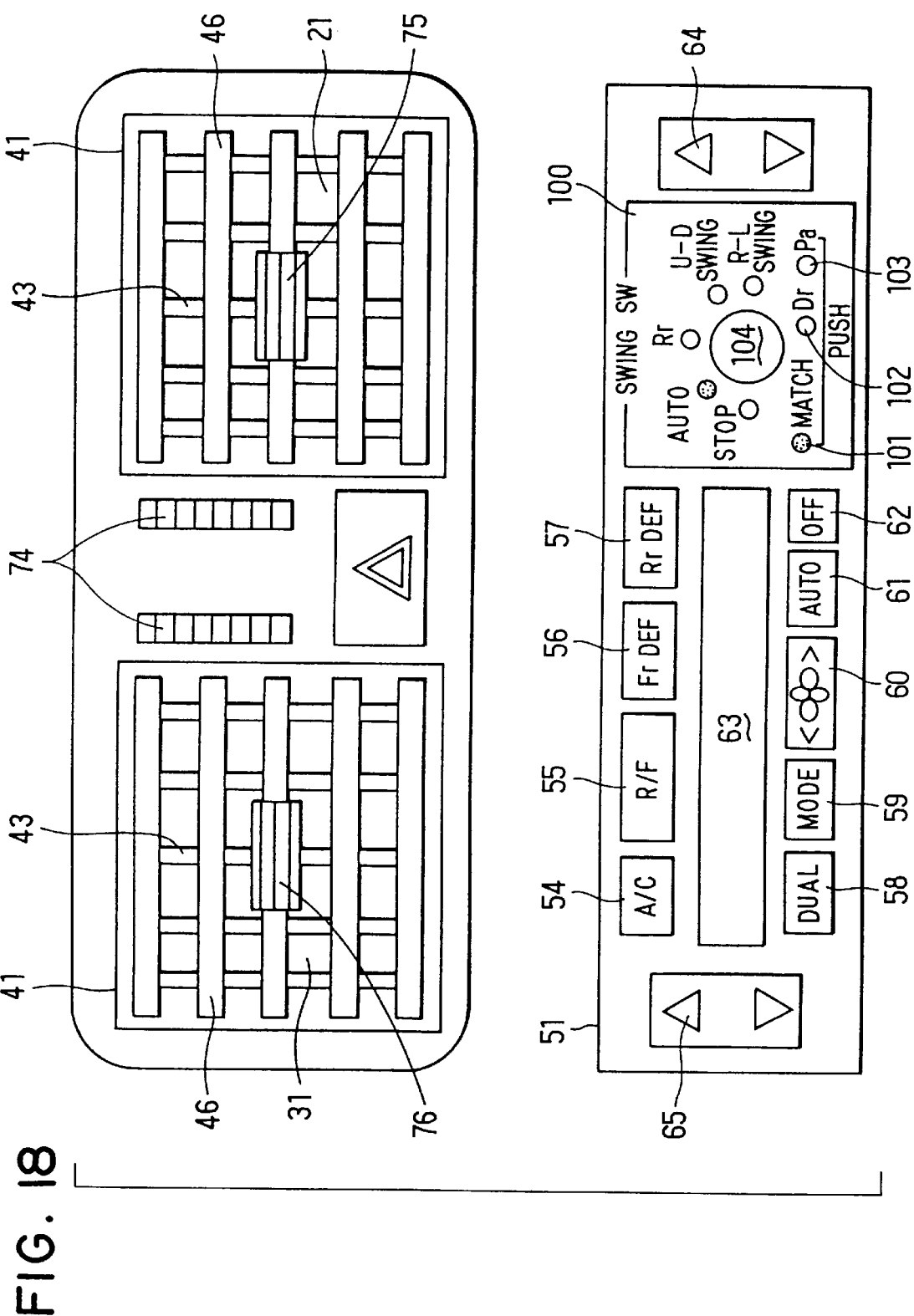
FIG. 18 is a front view showing an air-conditioning operation panel of a vehicle air conditioner according to a second preferred embodiment of the present invention.

A second preferred embodiment of the present invention will be now described with reference to FIG. 18. FIG. 18 is a front view showing an air-conditioning operation panel according to the second embodiment. As shown in FIG. 18, a louver operation (SWING SW) panel 100 for controlling air-blowing state of conditioned air blown from the face air outlets 21, 22, 31, 32 toward the right-seat side air-conditioning zone and the left-seat side air-conditioning zone is disposed integrally with the air-conditioning operation panel 51. On the louver operation panel 100, there are provided a match switch (MATCH) 101, a right switch (Dr) 102 which is set to swing the right-seat side center and side louvers 43, 46, a left switch (Pa) 103 which is set to swing the left-seat side center and side louvers 43, 46, and a swing mode selecting switch 104.

The swing mode selecting switch 104 is a rotary type switch having selecting positions of a swing stop position (STOP), an automatic swing position (AUTO), a rear swing position (Rr), an up-down swing position (U-D SWING) and a right-left swing position (R-L SWING).

When the swing mode selecting switch 104 is set at the automatic swing position (AUTO), the center and side louvers 43, 46 are automatically controlled. When the swing mode selecting switch 104 is set at the rear swing position (Rr), the center and side louvers 43, 46 are controlled so that an amount of air blown toward the rear-seat side air-conditioning zone becomes larger than an amount of air blown toward the front-seat side air-conditioning zone. When the swing mode selecting switch 104 is set at the up-down swing position (U-D SWING), the right-seat side center and side louvers 46 are manually controlled to be swung in the up-down direction in a predetermined swing range. Further, when the swing mode selecting switch 104 is set at the right-left swing position (R-L SWING), the center and side louvers 43 are manually controlled to be swung in the right-left direction in a predetermined swing range.

Each of the match switch 101, the right switch 102 and the left switch 103 is a push type switch having a normal position (OFF) and a pushed position (ON). When the match switch 101 is turned on, at least one of the center and side louvers 43, 46 on both the right seat side and the left seat side are set to be swung. When the right switch 102 is turned on, at least one of the center and side louvers 43, 46 on the right seat side are set to be swung. When the left switch 103 is turned on, at least one of the center and side louvers 43, 46 on the left seat side are set to be swung. In the second embodiment, the other portions are similar to those in the first embodiment, and the effect similar to that in the above-described first embodiment is obtained.

Figure 20:
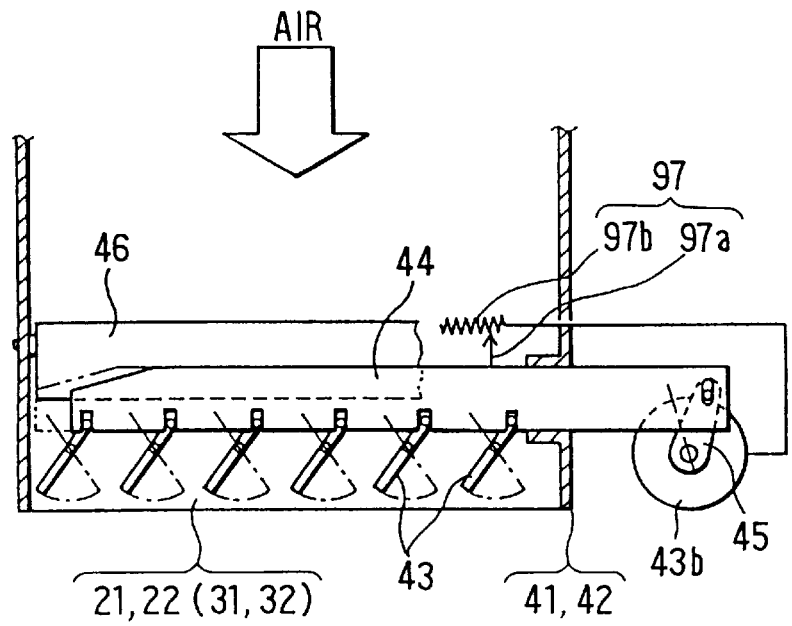
FIG. 20 is a schematic view showing a structure of a right-left swing mechanism of louvers according to the third embodiment.
Figure 21:
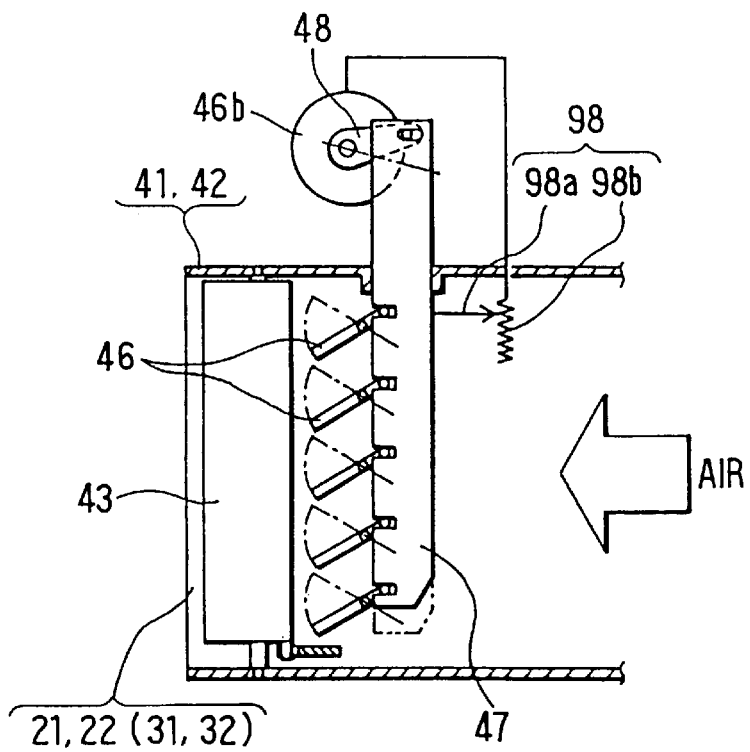
FIG. 21 is a schematic view showing a structure of an up-down swing mechanism of louvers according to the third embodiment.

A third preferred embodiment of the present invention will be now described with reference to FIGS. 19–21. FIG. 20 shows a swing mechanism of the louvers 43 in the right-left direction, and FIG. 21 shows a swing mechanism of the louvers 46 in the up-down direction.

Figure 19:
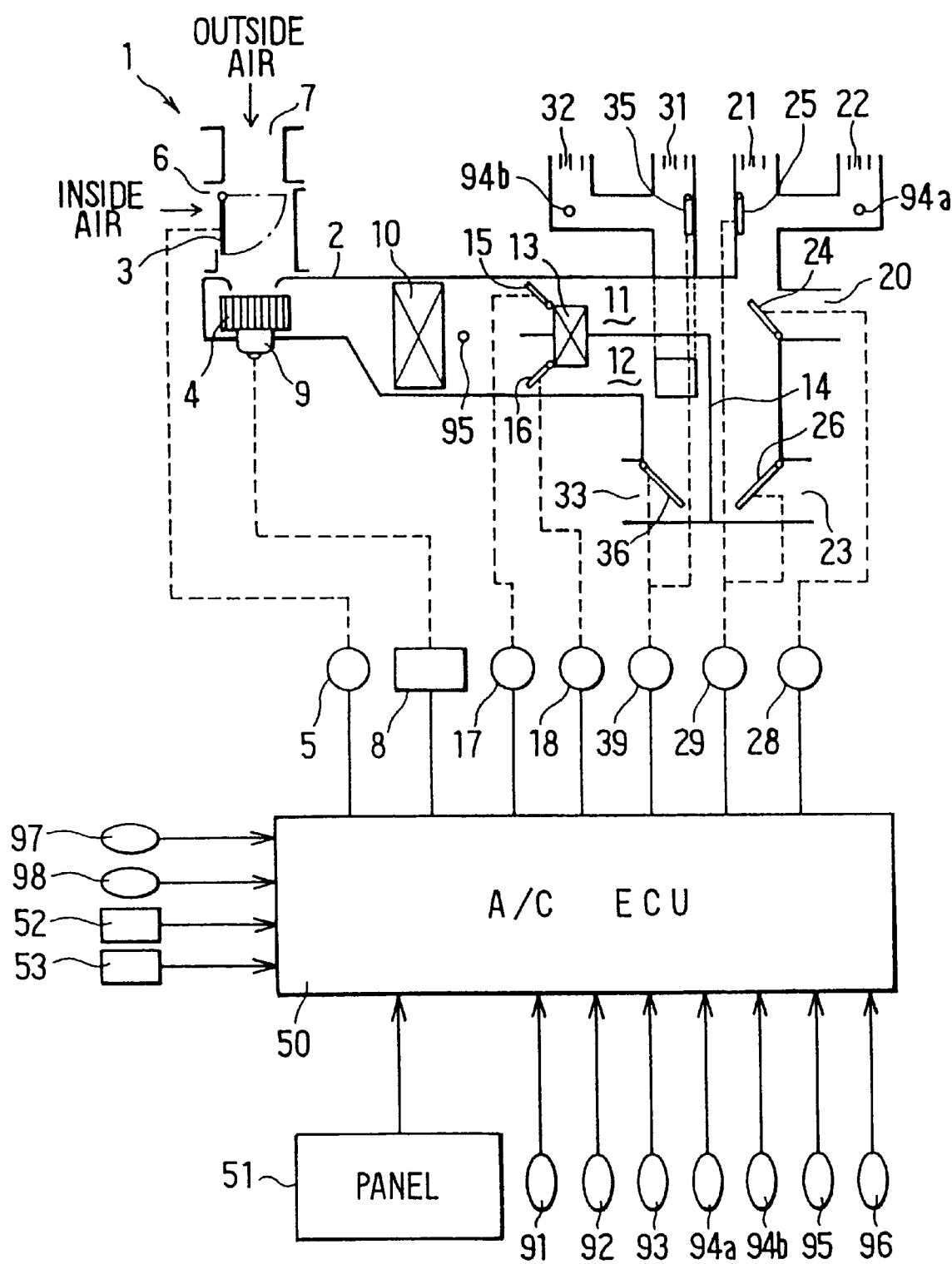
FIG. 19 is a schematic view showing an entire structure of a vehicle air conditioner according to a third preferred embodiment of the present invention.

As shown in FIG. 19, potentiometers 97, 98 for detecting present positions of the center and side louvers 43, 46 are connected to the air-conditioning ECU 50. In the third embodiment, plural potentiometers (e.g., four potentiometers) 97 are disposed to detect positions of louvers 43 moved in the right-left direction. As shown in FIG. 20, each of the plural potentiometers 97 includes a movable contact 97a reciprocated in the horizontal direction integrally with the link lever 44, and a resistance element 97b which changes a potential ratio by a movement of the movable contact 97a.

On the other hand, plural potentiometers (e.g., four potentiometers) 98 are disposed to detect positions of louvers 46 moved in the up-down direction. As shown in FIG. 21, each of the plural potentiometers 98 includes a movable contact 98a reciprocated in the up-down direction integrally with the link lever 47, and a resistance element 98b which changes a potential ratio by a movement of the movable contact 98a. Further, in the third embodiment, as shown in FIGS. 20, 21, servomotors 43b, 46b are used for operating the link levers 44, 47, instead of the stepping motors. In the third embodiment, since the other portions are similar to those in the above-described first embodiment, the effect similar to that in the first embodiment can be proposed.

Figure 22:
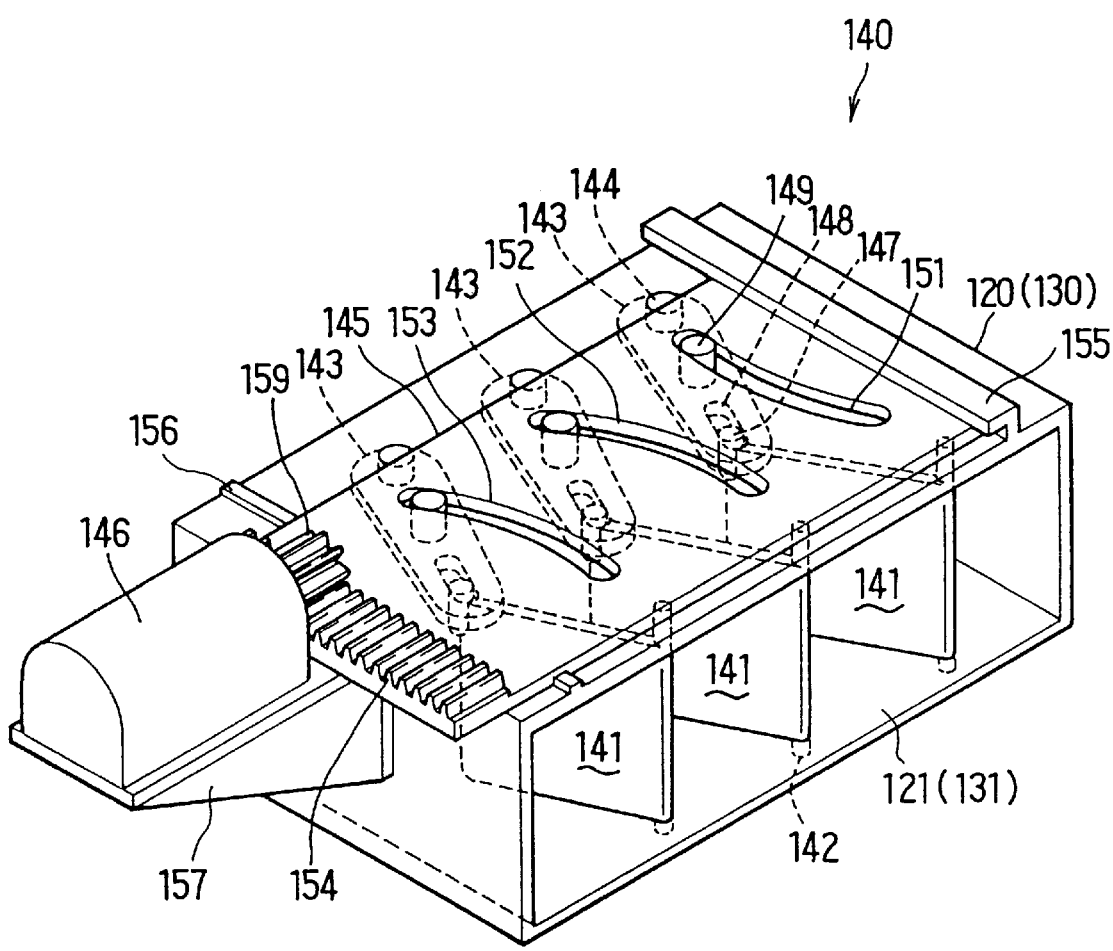
FIG. 22 is a perspective view showing a right-left swing mechanism of louvers according to a fourth preferred embodiment of the present invention.

A fourth preferred embodiment of the present invention will be now described with reference to FIGS. 22–24. As shown in FIG. 22, an air-blowing state changing unit 140 for swing first, second and third louvers 141 in the right-left direction is disposed in grills 120, 130 which respectively define center and side face air outlets 121, 131. The air-blowing state changing unit 140 includes the three louvers 141 which are swung in the right-left direction, three link plates 143 for swing the three louvers 141 in the right-left direction around each supporting point 142, a flat plate 145 for rotating the three link plates 143 around each supporting point 144, and a louver motor 146 as an actuator for reciprocating the flat plate 145 in a vehicle front-rear direction.

An elliptical engagement hole 148 is provided in each of the link plates 143 so that cylindrical pins 147 on the top ends of the louvers 141 are respectively engaged with the elliptical engagement holes 148 of the link plates 143. Further, a first engagement hole 151, a second engagement hole 152 and a third engagement hole 153 are provided in the flat plate 145 to be engaged with cylindrical pins 149 provided on each top end of the three link plates 143. A rack 154 is also provided on the flat plate 145 adjacent to a top end surface of the louver motor 146. In the grill 120, the first, second and third engagement holes 151-153 are provided in the flat plate 145 in reverse order with that in the grill 130.

The flat plate 145 is disposed to be guided by a guide 155 and a rail 156 provided on an outer wall surface of the grill 120, 130, and is disposed to be swung in the vehicle front-rear direction on the outer wall surface of the grill 120, 130. The louver motor 146 is disposed on an attachment holder 157 attached onto the outer wall surface of the grill 120, 130. Further, a pinion 159 engaged with the rack 154 is attached to a top outer portion of an output shaft of the louver motor 146.

Figure 23:
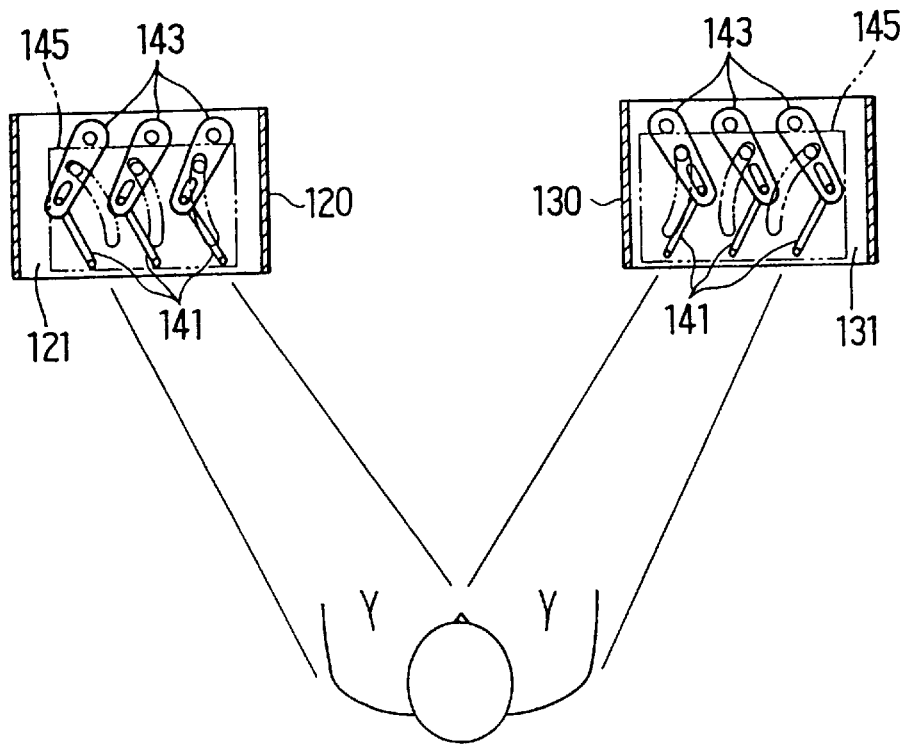
FIG. 23 is a view for explaining an air-blowing state of an air-blowing state changing unit during a spot air outlet mode according to the fourth embodiment.

As shown in FIG. 23, when the flat plate 145 is moved on each outer wall surface of the grills 120, 130 to a most vehicle rear side (i.e., passenger's side) by the operation of the louver motor 146 in a forward direction, each of the three louvers 141 in the grills 120, 130 is positioned to be toward the passenger so that conditioned air from the grills 120, 130 is collected to be blown toward the upper part of the passenger in an air-conditioning zone.

Figure 24:
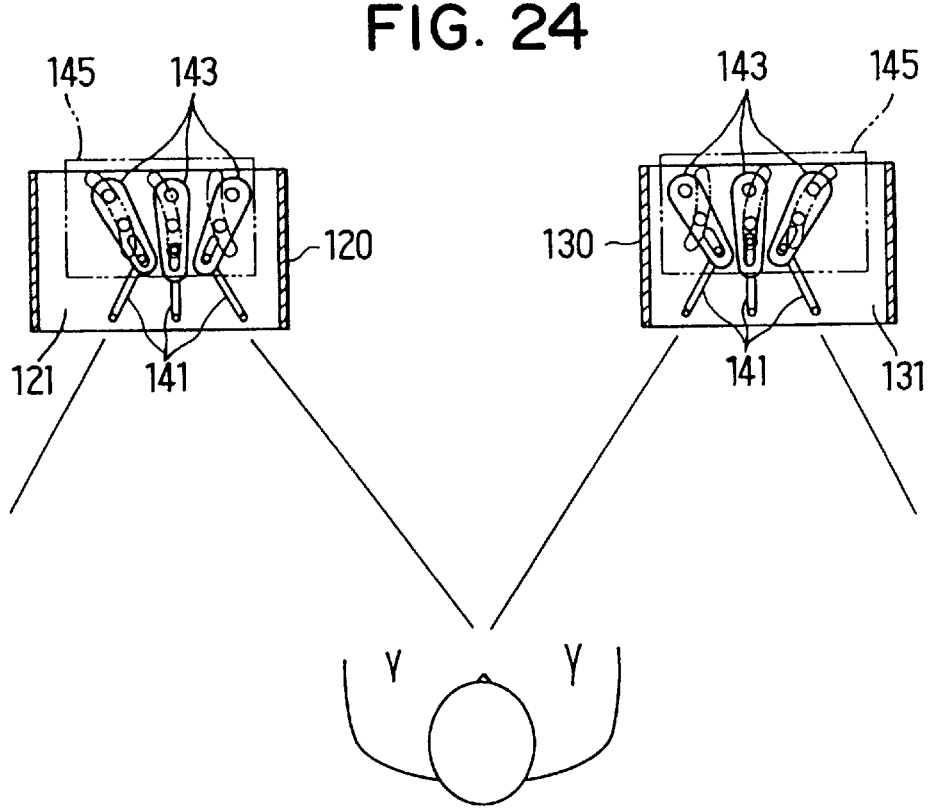
FIG. 24 is a view for explaining an air-blowing state of the air-blowing state changing unit during a wide air outlet mode according to the fourth embodiment.

On the other hand, as shown in FIG. 24, when the flat plate 145 is moved on each outer wall surface of the grills 120, 130 to a most vehicle front side (i.e., a side opposite to the passenger's side) by the operation of the louver motor 146 in a reversed direction, the first louver 141 on the most left side of the grill 120 is toward a left side and the first louver 141 on the most right side of the grill 130 is toward a right side. The second louvers 141 on the center of the grills 120, 130 are in the vehicle front-rear direction. Further, the third louvers 141 on the inner sides of the grills 120, 130 are toward the passenger on the air-conditioning zone. Thus, in this case, conditioned air blown from the grills 120, 130 is widely expended in the air-conditioning zone. According to the fourth embodiment of the present invention, by repeating operation of the louver motor 146 in the forward direction and in the reversed direction, the louvers 141 in the grills 120, 130 are swung around each supporting point.

Figure 25:
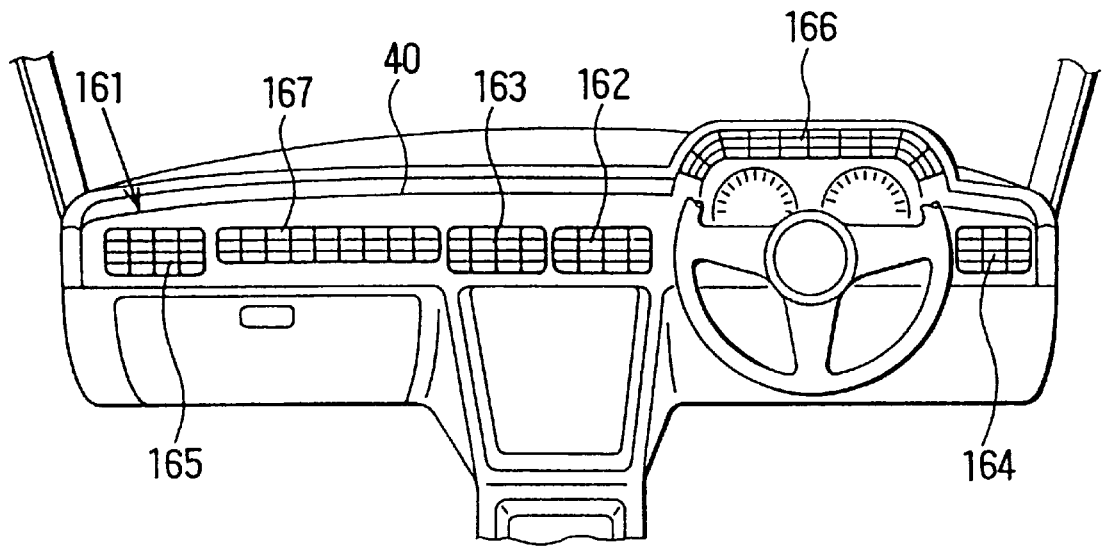
FIG. 25 is a front view showing a dashboard of a vehicle according to a fifth preferred embodiment of the present invention.
Figure 26:
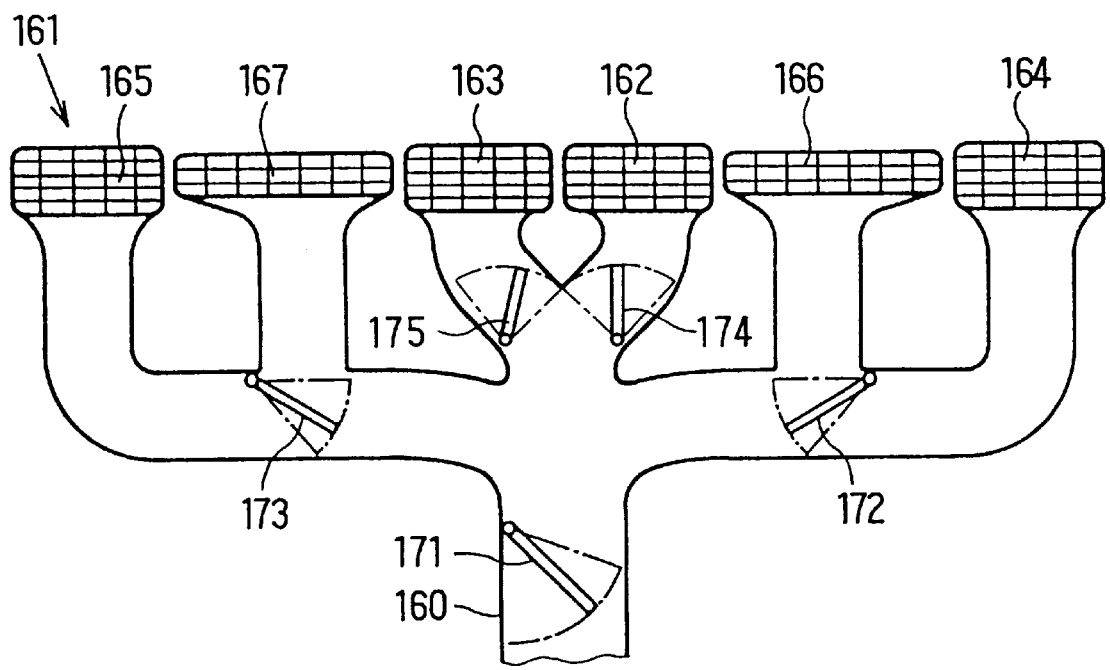
FIG. 26 is a schematic view of a face duct of an air conditioning unit according to the fifth embodiment.

A fifth preferred embodiment of the present invention will be now described with reference to FIGS. 25, 26. FIG. 25 is a front view showing a dashboard of a vehicle, and FIG. 26 is a schematic view showing a face duct 160. In the fifth embodiment, the partition plate 14 described in the first embodiment is not provided in the air conditioning duct 2. Further, the face duct 160 is connected to a downstream end of the air conditioning duct 2, and a wide face air-blowing portion 161 is provided at the most downstream side of the face duct 160.

The wide face air-blowing portion 161 includes right and left center face air outlets 162, 163 opened at a center area of the dashboard 40 in the vehicle right-left direction, a right-seat side side face air outlet 164 opened at a right area of the dashboard 40, a left-seat side side face air outlet 165 opened at a left area of the dashboard 40, a middle face air outlet 166 opened in the dashboard 40 between the right-seat side center face air outlet 162 and the right-seat side side face air outlet 164, and a middle face air outlet 167 opened in the dashboard 40 between the left-seat side center face air outlet 163 and the left-seat side side face air outlet 165. Plural louvers for manually changing air flow of conditioned air by a passenger are disposed in each of the face air outlets 162–167.

A main face door 171 for opening and closing a main air passage for all the face air outlets 162–167 is rotatably disposed in the face duct 160, and a first middle door 172 for opening and closing the side and middle face air outlets 164, 165 on the right seat side is rotatably disposed in the face duct 160. Further, in the face duct 160, a second middle door 173 for opening and closing the side and middle face air outlets 165, 167 on the left seat side, and first and second center face doors 174, 175 for opening and closing the right and left center face air outlets 162, 163 are rotatably disposed, respectively.

By changing each rotation position of the face doors 172, 173, 174, 175, each opening degree of the face air outlets 162–167 can be controlled so that air-blowing state of conditioned air is changed. When the main face door 171 is operated at an opened position by an actuator such as a servomotor, and when each of the first and second middle face doors 172, 173 is operated at a closed position so that both the middle face air outlets 166, 167 are closed, both side face air outlets 164, 165 are opened. Further, when both the center face air outlets 162, 163 are opened by the first and second center doors 174, 175, conditioned air is partially blown from the face air-blowing portion 161 toward the upper side of a passenger in an air-conditioning area. In this case, the swing stop time can be set similarly to the above-described embodiment.

On the other hand, when each of the first and second middle face doors 172, 173 is rotated at a middle position as shown in FIG. 26 while the main face door 171 is operated at the opened position, and when the center face air outlets 162, 163 are opened by the center face doors 174, 175, the entire face air outlets 162-167 can be opened. Therefore, air-blowing area of the face air-blowing portion 161 is made wider, and conditioned air is blown from the face air-blowing portion 161 toward the air-conditioning zone to be widely diffused.

Face doors may be additionally disposed in the face duct 160 so that air flow from the face air-blowing portion 161 can be further accurately controlled. A single partition plate or plural partition plates may be provided in the air conditioning duct 2 and the face duct 160, and plural blowers may be respectively disposed in divided passages. In this case, by changing air-blowing amount of each blower, air-blowing amount from each divided air passage in the face duct 160 can be arbitrarily changed. Further, when only the right and left center face air outlets 162, 163 are opened by the first and second doors 174, 175, conditioned air can be blown toward the passenger on the rear seat. Even in the face air-blowing portion 161, the effect similar to that of the present invention can be obtained.

Figure 27:
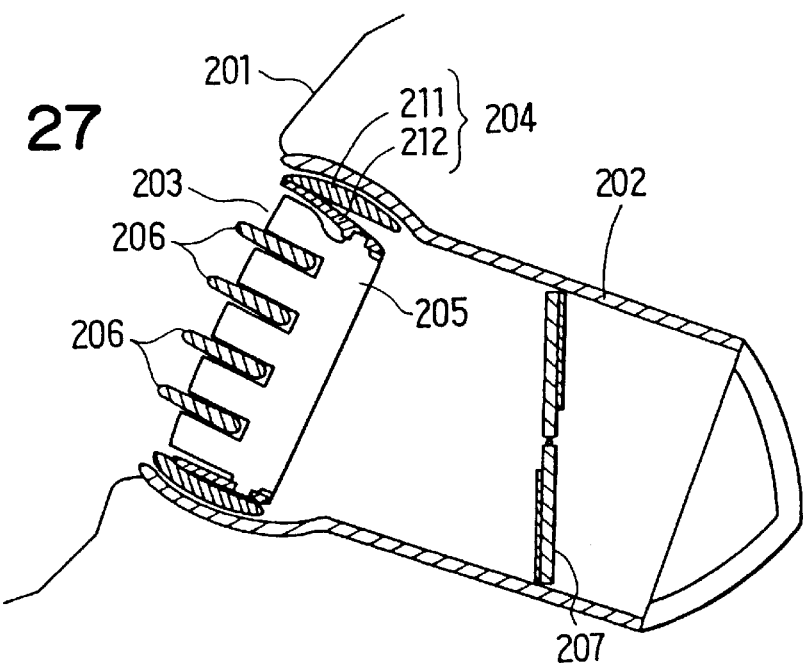
FIG. 27 is a cross-sectional view of a drum ventilator of a vehicle according to a sixth preferred embodiment of the present invention.

A sixth preferred embodiment of the present invention will be now described with reference to FIG. 27. FIG. 27 shows a drum ventilator according to the sixth embodiment of the present invention. The drum ventilator has a cylindrical case 202 disposed in a dashboard 201 to communicate with a face duct of an air-conditioning duct. The case 202 defines a face air outlet 203 through which air is blown toward the upper side of a passenger compartment. A cylindrical drum 204 for distributing air and for changing air-blowing state is rotatably disposed in the case 202 at a downstream end of the case 202.

A vertical louver 205 is held in the drum 204 to be rotatable in the vehicle right-left direction, and a later louver 206 is disposed in the drum 204 to be regularly assembled into the vertical louver 205. A damper 207 for adjusting an amount of conditioned air blown from the face air outlet 203 is rotatably held in the case 202 at an upstream side of the drum 204. Similarly to the first embodiment, the vertical louver 205 and the lateral louvers 206 are swung by an actuator through a link mechanism. The drum 204 includes a cylindrical first drum part 211 rotatably attached at an end portion of the case 202, and a cylindrical second drum part 212 disposed within the first drum 211.

In the sixth embodiment, when the air-blowing direction of conditioned air from the face air outlet 203 is changed, the direction of opening of the second drum part 212 is changed. For example, as shown in FIG. 27, when each center axis of the case 202, the first drum part 211 and the second drum part 212 are set to approximately correspond to each other, conditioned air is blown obliquely upwardly toward the head portion of a passenger in an air-conditioning zone. On the other hand, when the first drum part 211 and the second drum part 212 are rotated counterclockwise relative to the center axis of the case 202, conditioned air is blown downwardly toward the head and the chest of the passenger in the air-conditioning zone. In the sixth embodiment, a swing stop time is set so that pleasant cooling can be proposed. Further, even in the drum ventilator described in the sixth embodiment, the effect of the first embodiment can be proposed.

Figure 28:
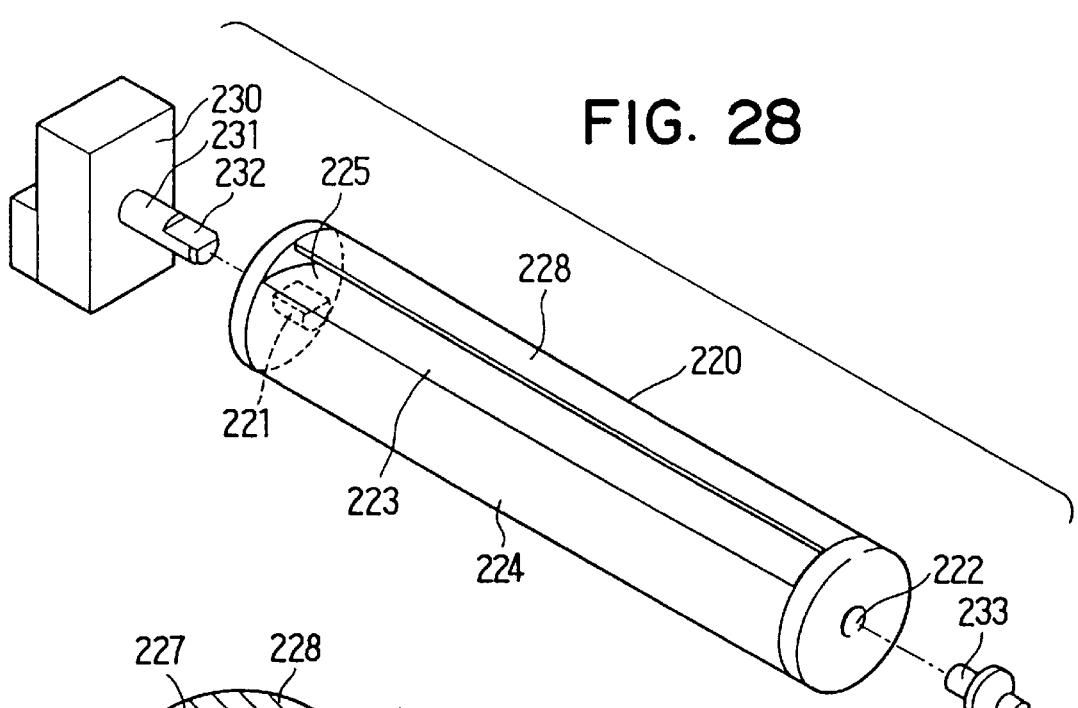
FIG. 28 is a perspective view showing an air-blowing louver according to a seventh preferred embodiment of the present invention.
Figure 29:
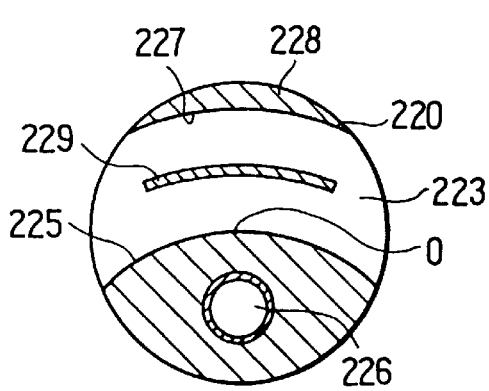
FIG. 29 is a cross-sectional view showing the air-blowing louver according to the seventh embodiment.

A seventh preferred embodiment of the present invention will be now described with reference to FIGS. 28, 29. FIGS. 28, 29 are views showing an air-blowing louver 220 of the seventh embodiment. The air-blowing louver 220 is made of resin and is formed into a thin and long cylindrical shape. One end of the air-blowing louver 220 is provided with an engagement hole 221 having a D-shaped cross section, and the other end thereof is provided with an insertion hole 222. As shown in FIG. 29, an air passage 223 is provided at a position offset from a rotation axis "O" of the air-blowing louver 220 along the axial direction of the air-blowing louver 220. Further, as shown in FIG. 28, a closed portion 224 is provided along the axial direction of the air-blowing louver 220 at a position opposite to the air passage 223 relative to the rotation axis "O". Specifically, the closed portion 224 includes convex surface 225 having a curvature center passing through the rotation axis "O". Further, the closed portion 224 has a solid portion formed by a part of outer peripheral surfaces of the convex surface 225 and the air-blowing louver 220, and a hollow portion 226 at a center of the closed portion 224.

Further, as shown in FIG. 29, the air-blowing louver 220 has a concave surface 227 having a curvature center, and a fin 228 is formed by a part of outer peripheral surfaces of the concave surface 227 and the air-blowing louver 220, so that an arch-like air passage 223 having a predetermined width is defined between the convex surface 225 and the concave surface 227. Further, an arch-shaped regulation fin 229 is disposed at a center position of the air passage 223 in the width direction.

The air-blowing louver 220 is accommodated within a thin and long rectangular air outlet (not shown) provided at the most downstream side of the air duct. An engagement shaft portion 232 having a D-shaped cross-section is formed in a rotation shaft 231 of a motor 230 such as a stepping motor or a servomotor to be engaged with the engagement hole 221 of the air-blowing louver 220. Further, a bearing pin 233 is disposed to protrude from a side wall of the air duct to be inserted into the insertion hole 222. Thus, the air-blowing louver 220 is supported by both the rotation shaft 231 of the motor 230 and the bearing pin 233, and is disposed to be swung in the up-down direction around the rotation axis "O" so that air-blowing direction of conditioned air blown from the air outlet is changed.

An eighth preferred embodiment of the present invention will be now described with reference to FIGS. 30–33. FIG. 30 is a front view showing a dashboard 301 and FIG. 31 is a disassemble view showing an air outlet portion provided in the dashboard 301, according to the eighth embodiment. As shown in FIG. 30, an air conditioning unit 302 for air-conditioning a passenger compartment is disposed at a lower inner side of the dashboard 301. As shown in FIG. 31, an air outlet duct 304 having a U-shaped cross section is disposed at a face side of the dashboard 301 to define a thin and long air outlet 303 extending in a straight line in the vehicle width direction. At a back closed side of the U-shaped air outlet duct 304, an air introduction duct 305 for introducing conditioned air from the air conditioning unit 302 to the air outlet 303 is connected.

Onto a face side of the air outlet duct 304, opposite to the back closed side, a louver supporting frame 306 is attached. Plural vertical louvers 307 and plural lateral louvers 309 for changing a blowing direction of conditioned air from the air outlet 303 toward an air-conditioning zone of the passenger compartment are regularly disposed in the louver supporting frame 306 in lattice like. A rotation valve 310 for changing an opening degree of the air outlet 303 is disposed at an upstream side of the louver supporting frame 306.

Both supporting shafts 311 of the rotation valve 310 are rotatably held in slits 312 of the air outlet duct 304 so that the rotation valve 310 is rotatably supported by the air outlet duct 304. The rotation valve 310 has both end walls 313 at both ends, and is formed into an approximately half opened shape. As shown in FIG. 31, the rotation valve 310 has an approximate straight rear end 314 as one opened end, and a face end 315 as the other opened end. The face end 315 has a horizontal straight line portion 316 at a center, and right and left bent portions 317 formed at both sides of the straight line portion 316. Thus, the rotation valve 310 has a semi-circular sectional shape at the straight line portion 316, and the semi-circular sectional shape of the rotation valve 310 is gradually changed in the right and left bent portions 317 toward both end sides.

Further, both adjustment dials 319 are fixed to outer ends of the supporting shafts 311 of the rotation valve 310. By rotating the rotation valve 310 through the adjustment dials 319, an air blowing state of conditioned air is adjusted. The supporting ends 311 of the rotation valve 310 are rotated by an actuator through a link mechanism, similarly to the above-described first embodiment.

According to the eighth embodiment of the present invention, when the rotation valve 310 is rotated by the actuator to a rotation position of a spot air outlet mode, a center portion of the air outlet 303 is fully closed by the rotation valve 310, as shown in FIG. 32A. On the other hand, as shown in FIGS. 32B, 32C, on the right and left end sides of the air outlet 303, the opening degree of the air outlet 303 gradually becomes larger as an opened portion becomes closer to the right and left ends of the air outlet 303. As a result, in the spot air outlet mode, conditioned air is mainly blown from the right and left end sides of the air outlet 303 toward the passenger in the air-conditioning zone.

On the other hand, the rotation valve 310 is rotated by the actuator to a rotation position of a wide air outlet mode, an approximate entire part of the air outlet 303, including the center portion and the right and left side end portions, are opened as shown in FIGS. 33A, 33B, 33C. Therefore, during the wide air outlet mode, conditioned air of the air conditioning unit 302 is blown from the entre width length of the air outlet 303 uniformly toward the air-conditioning zone. In the eighth embodiment, the other portions are similar to those in the first embodiment, and the effect in the first embodiment can be obtained.

Figure 34A:
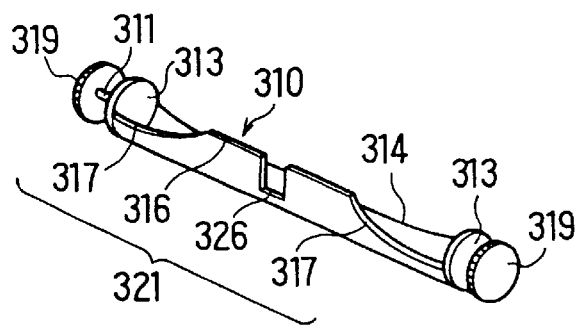
FIGS. 34A–34E are perspective views showing various rotation valves according to a ninth preferred embodiment of the present invention.
Figure 34B:
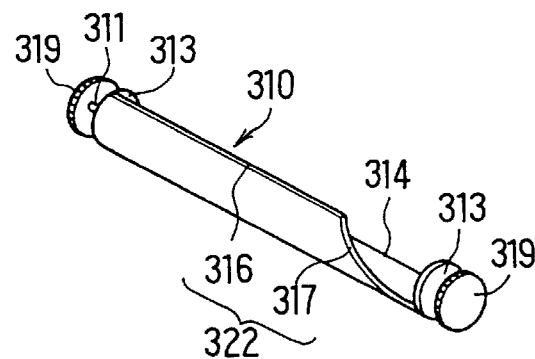
Figure 34C:
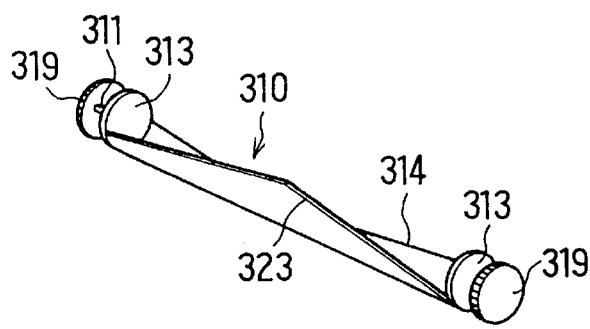
Figure 34D:
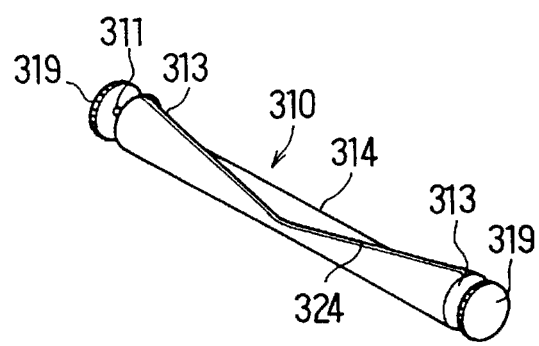
Figure 34E:
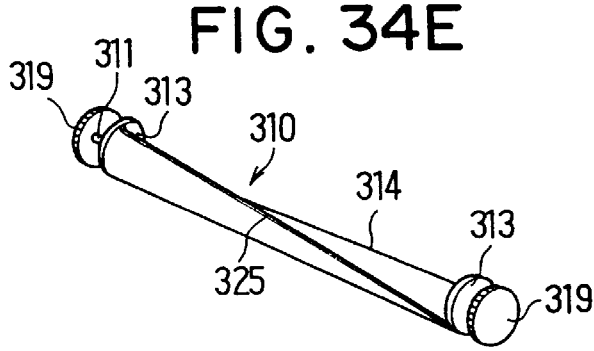

A ninth preferred embodiment of the present invention will be now described with reference to FIGS. 34A, 34B, 34C, 34D, 34E. In the ninth embodiment, the shape of the rotation valve 310 is variously changed as shown in FIGS. 34A–34E. That is, while the rear end 314 of the rotation valve 310 is formed similar to that in the above-described eighth embodiment, the shape of the face end 315 in the eighth embodiment is variously changed. For example, as shown in FIG. 34A, a face end 321 of the rotation valve 310 has a recess portion 326 in the straight line portion 316. Therefore, during the spot air outlet mode, conditioned air is partially blown both the bent portion 317 and the recess portion 326. Further, as shown in FIG. 34B, in a face end 322 of the rotation valve 310, only the right bent portion 317 of the above-described eighth embodiment is provided so that the straight line portion 316 extends to the left end of the rotation valve 310. Therefore, during the spot air outlet mode, conditioned air is blown only from the bent portion 317. Further, as shown in FIG. 34C, a face end 323 of the rotation valve 310 is formed into a reversed V-shape in an entire length, so that the amount of conditioned air is gradually increased as an opened portion defined by the face end 323 becomes closer to the right and left ends of the rotation valve 310. Further, as shown in FIG. 34D, a face end 324 of the rotation valve 310 is formed into a V-shape in an entire length, so that the amount of conditioned air is gradually increased as an opened portion defined by the face end 324 becomes closer to a center portion from the right and left ends of the rotation valve 310. Further, as shown in FIG. 34E, a face end 325 of the rotation valve 310 is formed into an oblique straight line in an entire length, so that the amount of conditioned air is gradually increased as an opened portion defined by the face end 325 becomes closer to the right end of the rotation valve 310 from the left end of the rotation valve 310. In the ninth embodiment, the other portions are similar to those in the ninth embodiment.

Figure 35:
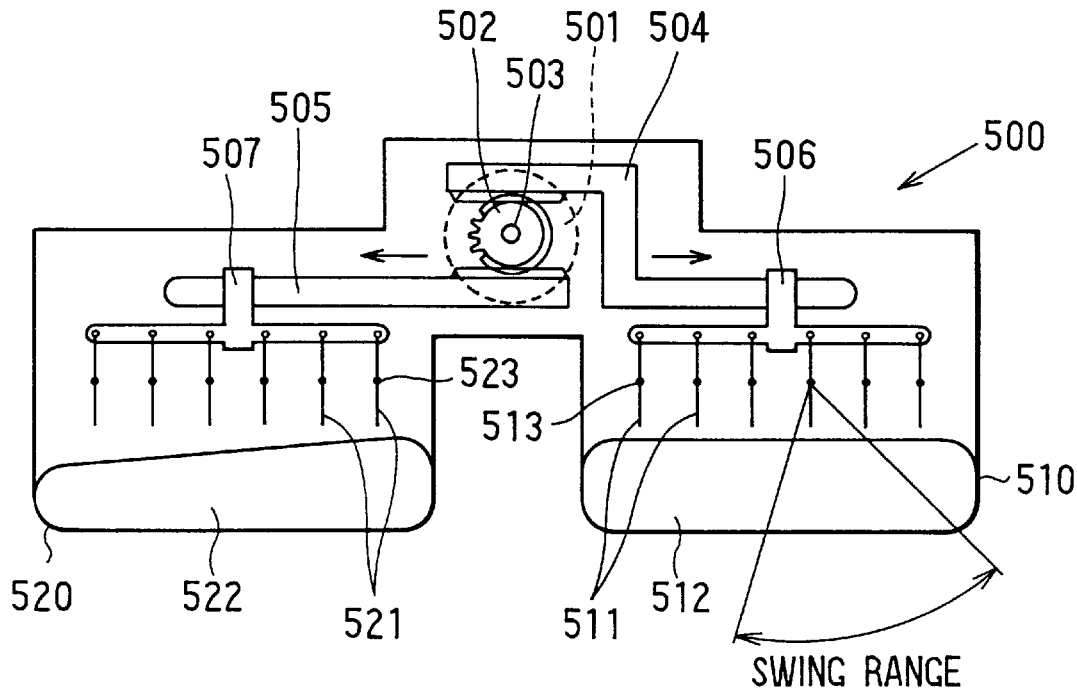
FIG. 35 is a schematic view of a swing unit having both center grills swung in a right-left direction to be right-left symmetrically by a single louver motor according to a tenth preferred embodiment of the present invention.

A tenth preferred embodiment of the present invention will be now described with reference to FIGS. 35, 36. FIG. 35 shows a swing unit 500 of the tenth embodiment. In the tenth embodiment, as shown in FIG. 35, both right and left center grills 510, 520 are operated by a single louver motor 501 to be swung in the right-left direction approximately symmetrically relative to a center line between the right and left center grills 510, 520. That is, both the right and left center grills 510, 520 are right-left symmetrically swung in the right-left direction.

In the above-described first embodiment, as shown in FIG. 5, relative to a single center grill and a single side grill on one side, the single stepping motor 43a is provided so that the louvers 43 are swung in the right-left direction. However, in the tenth embodiment, as shown in FIG. 35, each of the louvers 511, 521 of the right and left center grills 510, 520 is swung in the right-left direction by the single louver motor 501 rotatable in forward and reverse directions through rack and pinion mechanism. The rack and pinion mechanism includes a pinion gear 502, a right-seat side link plate 504 having a rack and a left-seat side link plate 505 having a rack.

The pinion gear 502 engaged with the racks of both the link plates 504, 505 is fixed onto an outer peripheral portion of an output shaft 503 of the louver motor 501. In the tenth embodiment, as shown in FIG. 35, the rack of the link plate 504 is engaged with the pinion gear 502 at an upper side, and the rack of the link plate 505 is engaged with the pinion gear 502 at a lower side. Connection plates 506, 507 integrated with the louvers 511, 521 are connected to the link plates 504, 505, respectively. Both the right and left center grills 510, 520 are disposed at a downstream end of an air-conditioning unit to define right and left center face air outlets 512, 522, respectively.

Each of the louvers 511 has a supporting point 513 at the center, and each of the louvers 521 has a supporting point 523 at the center. By swinging the louvers 511, 521 in the right-left direction, a blowing direction of conditioned air blown from the right and left center face air outlets 512, 522 formed in the right and left center grills 510, 520 into the passenger compartment can be changed.

In the tenth embodiment, when the pinion gear 502 is rotated clockwisely by the louver motor 501, the link plate 504 is moved toward the right side in FIG. 35 through the rack, and the link plate 505 is moved toward the left side in FIG. 35 through the rack. At this time, the right-seat side louvers 511 are moved toward the left side in FIG. 35, and the left-seat side louvers 521 are moved toward the right side in FIG. 35.

Conversely, when the pinion gear 502 is rotated counter-clockwisely by the louver motor 501, the link plate 504 is moved toward the left side in FIG. 35 through the rack, and the link plate 505 is moved toward the right side in FIG. 35 through the rack. At this time, the right-seat side louvers 511 are moved toward the right side in FIG. 35, and the left-seat side louvers 521 are moved toward the left side in FIG. 35. Thus, in the swing unit 500 of the tenth embodiment, both the right and left grills 510, 520 are operated by the single louver motor 501 to be right-left reversely swung in the right-left direction.

Figure 36:
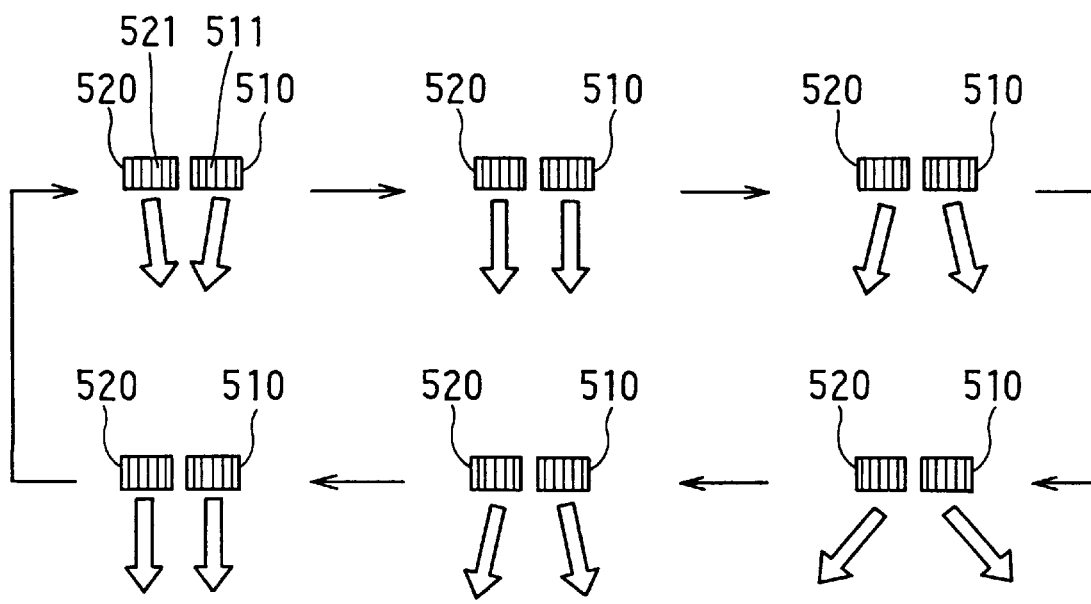
FIG. 36 is a schematic view showing air-blowing directions of both the center grills according to the tenth embodiment.

FIG. 36 shows various states of the right and left center grills 510, 520. As shown in FIG. 36, when conditioned air is blown from the right-seat side center grill 510 toward a vehicle right side, conditioned air is blown from the left-seat side center grill 520 toward a vehicle left side. Further, when conditioned air is blown from the right-seat side center grill 510 toward a vehicle rear side straightly, conditioned air is blown from the left-seat side center grill 520 toward the vehicle rear side straightly. Further, when conditioned air is blown from the right-seat side center grill 510 toward a vehicle left side, conditioned air is blown from the left-seat side center grill 520 toward a vehicle right side. That is, conditioned air blown from the right-seat side center grill 510 and conditioned air blown from the left-seat side center grill 520 are right-left symmetrical. In the tenth embodiment, the "right-left symmetrical" means that: the left side grill is toward a left side when the right side grill is toward a right side, the left side grill is toward the right side when the left side grill toward the left side, and the left side grill is toward a vehicle rear side when the right side grill is toward the vehicle rear side.

According to the tenth embodiment, because the louvers 511, 521 of both the center grill 510, 520 are swung by using the single louver motor 501, an attachment space of the louver motor 501 can be made smaller, and the structure of the swing unit 500 can be made simple. In the above-described tenth embodiment, the louvers 511, 521 of both the right and left center grills 510, 520 are swung by the single louver motor 501. However, louvers of plural grills more than two may be swung by a single louver motor. Further, louvers of plural grills more than two may be swung by louver motors having a number smaller than that of the plural grills.

In the above-described tenth embodiment of the present invention, using the rack-pinion mechanism, the louvers 511, 521 of the both center grills 510, 520 are swung right-left symmetrically in the horizontal direction (right-left direction). However, the louvers 511, 521 of the both center grills 510, 520 may be swung vertically symmetrically.

Figure 37:
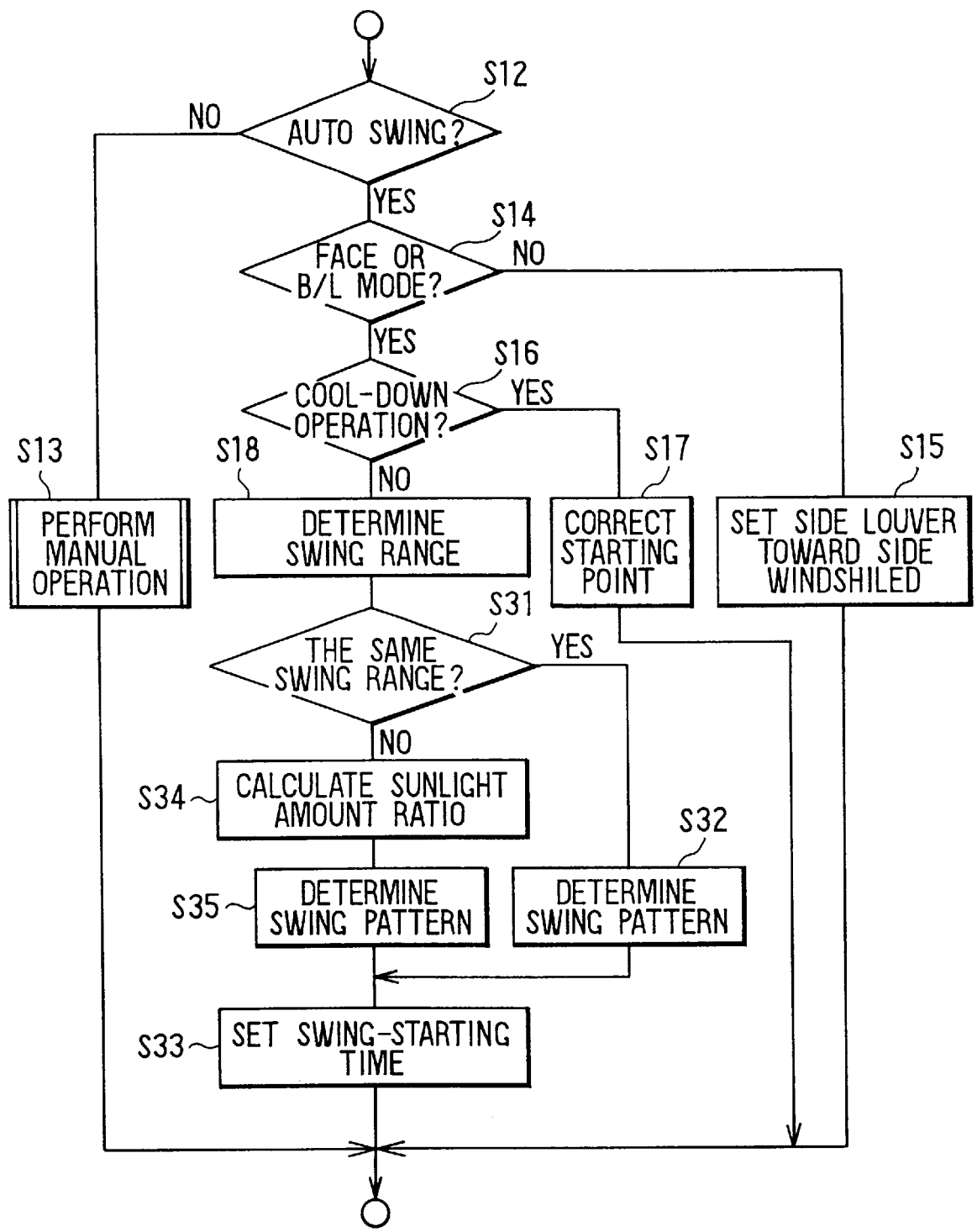
FIG. 37 is a flow diagram showing a control program of swing louvers according to an eleventh preferred embodiment of the present invention.
Figure 38A:
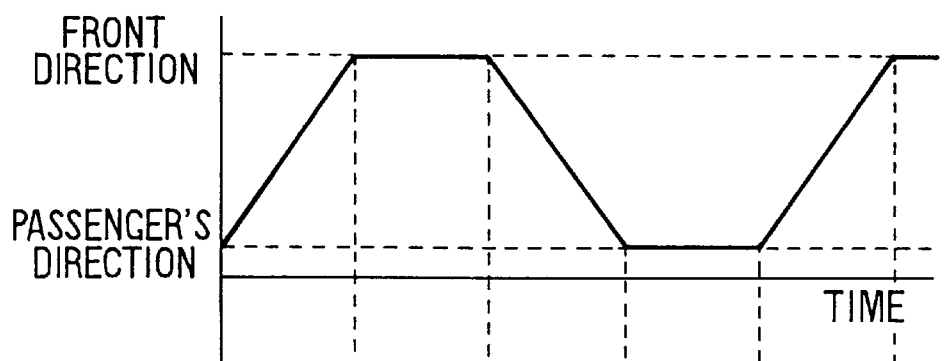
FIG. 38A is a time chart showing a swing pattern during a wide swing range according to the eleventh embodiment.
Figure 38B:
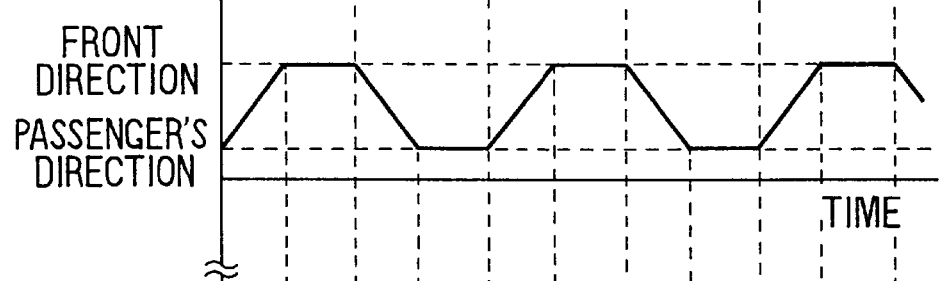
FIG. 38B is a time chart showing a swing pattern during a narrow swing range according to the eleventh embodiment.
Figure 38C:
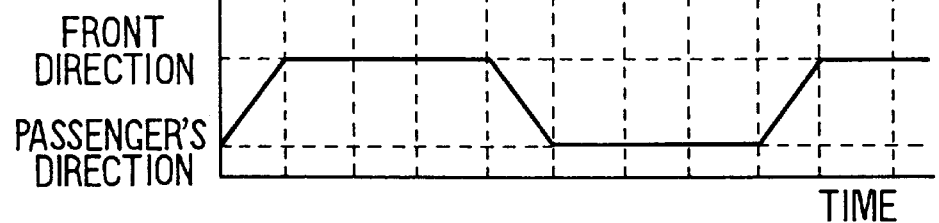
FIG. 38C is a time chart showing a swing pattern of the first embodiment when a swing periodic time is set to be equal to FIG. 38A.

An eleventh preferred embodiment of the present invention will be now described with reference to FIGS. 37, 39. In the eleventh embodiment, the structure of right and left center louvers is similar to the louvers 43, 46 of the above-described first embodiment. FIG. 37 is a flow diagram showing a control of a swing unit, FIG. 38A is a graph showing a swing pattern when a swing range is wide, and FIG. 38B is a graph showing a swing pattern when a swing range is narrow according to the eleventh embodiment. On the other hand, FIG. 38C is a graph showing a swing pattern of the first embodiment with the same periodic time as FIG. 38A. In FIGS. 38A, 38B, 38C, for example, the right center louvers 43 shown in FIG. 3 are swung between the right front-passenger's direction and the front direction (i.e., a direction from a vehicle front center to a vehicle rear center), and the left center louvers 43 are swung between the left-passenger's direction and the front direction.

In the eleventh embodiment, the control program of an air-conditioning ECU is similar to that in FIG. 7. That is, in the eleventh embodiment, at step S7 in FIG. 7, the control routine of FIG. 37 is started. In the control routine shown in FIG. 37, the steps similar to those in FIG. 10 of the first embodiment are indicated with the same step numbers, and the explanation thereof is omitted. In the eleventh embodiment, as shown in FIG. 37, after the right-seat side swing range and the left-seat side swing range are determined at step S18, it is determined whether or not the right-seat side swing range is equal to the left-seat side swing range at step S31. When the widths of the swing ranges of the louvers 43 on both the right and left seat side are the same at step S31, a swing stop time is calculated from the sunlight amount, and a swing pattern is determined at step S32 so that the right and left seat side louvers 43 shown in FIG. 3 have the same swing pattern. For example, the swing pattern is controlled in such a manner that the left center louvers 43 are positioned in a direction toward the passenger on the left front seat while the right center louvers 43 are positioned in a direction toward the passenger on the right front seat, and the left center louvers 43 are positioned in a direction toward the passenger on the right rear seat while the right center louvers 42 are positioned in a direction toward the passenger on the left rear seat. Next, at step S33, swing-starting time of the swing pattern of the right center louvers 43 is set to be equal to swing-starting time of the swing pattern of the left center louvers 43. Thereafter, the control routine of FIG. 37 is finished. At step S33, instead of the swing-starting time, a swing-stop time may be set.

On the other hand, when the widths of the swing ranges on both the right and left seat side are different from each other at step S31, a sunlight amount ratio between right and left seat sides is calculated (determined) at step S34, and swing patterns of the different swing ranges are determined as shown in FIGS. 38A, 38B. That is, as shown in FIGS. 38A, 38B, the swing periodic time of FIG. 38A where the swing range is wide is set to be twice the swing periodic time of FIG. 38B where the swing range is narrow. After the swing patterns for different swing ranges are determined at step S35, the swing-starting time of the swing patterns of the right-seat side center louvers 43 is set to be partially equal to the swing-starting time of the swing patterns of the left-seat side center louvers 43 by plural patterns. Here, instead of the swing-starting time, a swing-stop time may be set. That is, after the swing patterns of the right and left seat side center louvers 43 having different swing ranges are determined, the swing-stop time of the right-seat side center louvers 43 is set to be partially equal to that of the left-seat side center louvers 43 by plural patterns.

According to the eleventh embodiment of the present invention, as shown in FIGS. 38A, 38B, the swing periodic time of the narrow swing range of one side center louvers 43 is set to be half of the swing periodic time of the wide swing range of the other side center louvers 43, so that the swing-starting times of the center louvers 43 are partially set to be equal. Therefore, a ratio of the long swing periodic time to the short swing periodic time can be set to a whole number, so that the swing starting-times of the center louvers 43 are set to partially correspond to each other. Thus, it can prevent swing stop time of the center louvers 43 from being longer for correcting the swing periodic time of the narrow swing range, while a swing different between the right and left grills is restricted. However, in the above-described first embodiment, as shown in FIG. 38C, when the swing range of one side louvers 43 is narrower than that the other side louvers 43, the swing stop time of the one side louvers 43 is made longer so that the swing periodic time of the narrow swing range is set to be equal to that of the wide swing range of FIG. 38A. Therefore, in this case, the swing stop time (or slow swing time) may become too longer.

Figure 39A:
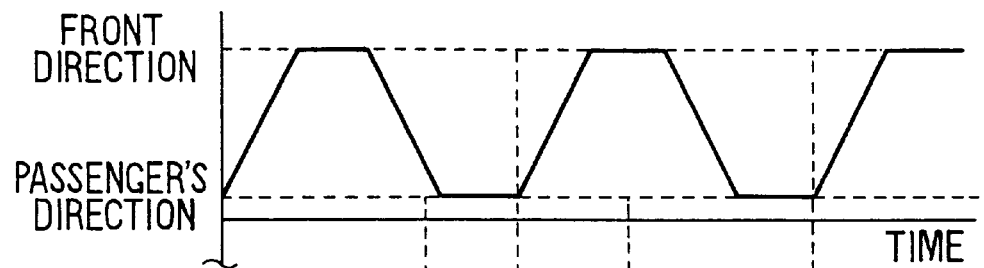
FIG. 39A is a time chart showing a swing pattern during a wide swing range according to the eleventh embodiment.
Figure 39B:
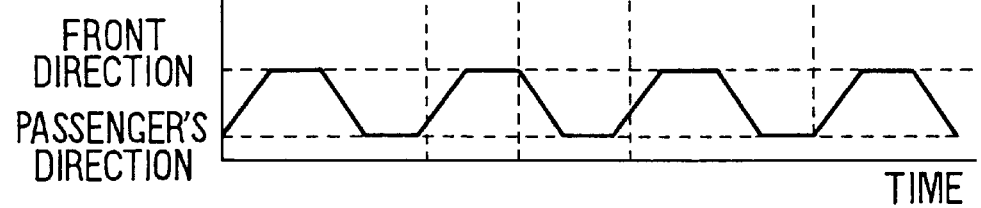
FIG. 39B is a time chart showing a swing pattern during a narrow swing range according to the eleventh embodiment.
Figure 40:
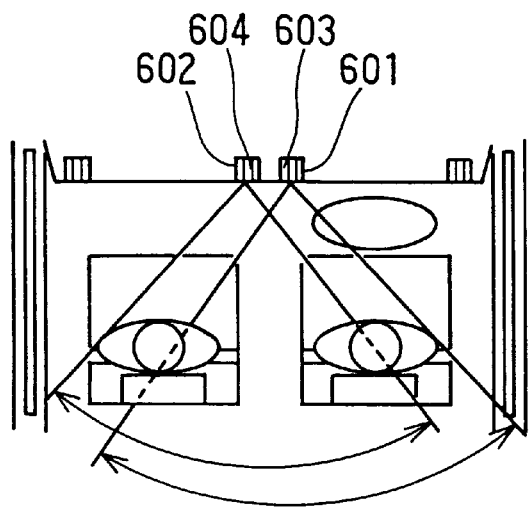
FIG. 40 is a view showing a conventional louver swing range of conditioned air blown into a passenger compartment.

In the above-described eleventh embodiment, the swing periodic time of the wide swing range of the one side center louvers 43 is set to be twice as large as the swing periodic time of the narrow swing range of the other side center louvers 43. However, as shown in FIGS. 39A, 39B, a periodic ratio of a swing periodic time of a wide swing range to a swing periodic time of a narrow swing range can be set at 1.5 in the right and left center louvers 43. Further, the periodic ratio is not necessary to be just set at 1.5 or 2, but may be approximately 1.5 or 2.

Further, when the right and left center grills having different swing ranges are swung with the same speed, the swing pattern of a wide swing range is set to be similar to that of a narrow swing range so that both swing-starting times may be set to be partially equal.

According to the eleventh embodiment of the present invention, when one side louvers 43 are operated with first operation patterns each having a first periodicity and the other side louvers 43 are operated with second operation patterns each having a second periodicity, a ratio of the first periodicity to the second periodicity is approximately an integer number. Further each first operation pattern has a first starting time, each second operation pattern has a second starting time, and the first starting time is set to be approximately corresponded (equal) to the second starting time partially by plural periodic patterns. Therefore, swing-starting time or swing-stop time of swing patterns can be partially corresponded to each other in both first and second operation patterns by plural patterns, and the operation of the louvers 43 is made to be looked nice. Further, in the eleventh embodiment, each first operation pattern has a first ratio between operation time and stop time, each second operation pattern has a second ratio between operation time and stop time, and the first ratio can be set to be approximately equal to the second ratio.

Although the present invention has been fully described in connection with the preferred embodiments thereof with reference to the accompanying drawings, it is to be noted that various changes and modifications will become apparent to those skilled in the art.

For example, in the above-described first embodiment, even during the foot mode or the foot/defroster mode, conditioned air is blown from the right and left side face air outlets 22, 32. However, the air conditioning unit 1 is set so that conditioned air is blown from the right and left side face air outlets 22, 32 only during the face mode or the bi-level mode.

In the above-described first embodiment, the right and left center grills 41 and the right and left side grills 42 are fixed onto the dashboard 40. However, right and left center grills may be held in a house member to be rotatable in the right-left direction, and center and side grills may be held in a house member to be rotatable in the up-down direction. In this case, the grills may be directly swung.

In the above-described first embodiment, the air-blowing state changing unit such as the swing louvers for changing the swing range of conditioned air is provided in the face air outlets 21, 22, 31, 32 on the dashboard. However, the air-blowing state changing unit may be provided on a vehicle side surface, a vehicle center or a vehicle ceiling.

In the above-described first embodiment, the center and side louvers 43 for swinging in the right-left direction within the face air outlets and the center and side louvers 46 for swinging the up-down direction are provided. However, only the center and side louvers 43 or only the center and side louvers 46 may be provided.

In the above-described first embodiment of the present invention, conditioned air is blown by the single blower from the face air outlets 21, 22, 31, 32 into the passenger compartment. However, both blowers may be provided for blowing conditioned air respectively from the right and left seat side face air outlets toward the right and left air-conditioning zone of the passenger compartment. Further, plural blowers corresponding to the number of the face air outlets may be disposed so that each air-blowing amount from the face air outlets can be changed.

In the above-described first embodiment of the present invention, the present invention is applied to the vehicle air conditioner having the air conditioning unit 1 in which the temperature adjustment for the right-seat side air-conditioning zone and the temperature adjustment for the left-seat side air-conditioning zone are independently performed. However, the present invention may be applied to a vehicle air conditioner in which temperature adjustment for a front-seat side air-conditioning zone and temperature adjustment for a rear-seat side air-conditioning zone are independently performed. Further, the present invention may be applied to a vehicle air conditioner having a single temperature adjustment unit for adjusting temperature of air to be blown into the passenger compartment.

Further, the swing range of the right center louvers 43, 46 and the swing range of the left center louvers 43, 46 may be independently shifted, and the shifted swing range may be independently controlled. Further, the swing range of the right center louvers 43, 46 and the swing range of the right side louvers 43, 46 may be independently shifted, and the shifted swing range may be independently controlled. Further, the swing range of the left center louvers 43, 46 and the swing range of the left side louvers 43, 46 may be independently shifted, and the shifted swing range may be independently controlled.

In the above-described embodiments of the present invention, the sunlight amount (sunlight intensity) is detected by using the sunlight sensor 93 as a sunlight state detecting unit. However, as the sunlight state detecting unit, a sunlight-entering direction detecting unit for detecting a sunlight entering direction and a solar height detecting unit for detecting a height of solar may be used. Further, the sunlight sensor may be made of a thermal element such as a photodiode, a solar battery or a thermistor. When the solar height or the sunlight direction relative to the vehicle is stored in a microcomputer of a car-navigation system, solar signals from the car-navigation system are input into an air-conditioning ECU.

Further, as the air-conditioning load, the number of passengers in the passenger compartment may be added in addition to the conditions shown in FIG. 17. Further, as the inside air temperature sensor 91, both a right-seat side inside air temperature sensor disposed in the right-seat side air-conditioning zone and a left-seat side inside air temperature sensor disposed in the left-seat side air-conditioning zone may be used.

Further, in the above-described embodiments, for detecting operation position of the air-blowing state changing unit such as louvers, pulse number sent to the stepping motor is counted, or the potentiometer is provided in the servomotor. However, in a servomotor without having a potentiometer, an armature noise may be counted so that the operation angle position of the air-blowing state changing unit is calculated.

Further, in the above-described first embodiment of the present invention, when sunlight enters from one side of the vehicle, swing speed of the side louvers 43 on the one side may be set to be slower than that of the center louvers 43. Similarly, the swing-stop time of the side louvers 43 may be longer than that of the center louvers 43. Further, a slow swing time of the side louvers 43, for which the louvers 43 are swung in a speed lower than a predetermined speed, may be set to be longer than that of the center louvers 43. Further, a slow swing range of the side louvers 43, for which the louvers 43 are swung in a speed lower than the predetermined speed, may be set to be longer than that of the center louvers 43. In this case, similarly to the above-described embodiment, the swing stop time, the slow swing range and the slow swing time may be set in accordance of the air-conditioning load.

Such changes and modifications are to be understood as being within the scope of the present invention as defined by the appended claims.

What is claimed is:

1. An air conditioner for a vehicle having a passenger compartment, comprising:

an air conditioning unit having a plurality of air outlets for blowing conditioned air toward plural air-conditioning zones in the passenger compartment, the air conditioning unit being set to respectively independently adjust air temperature to be blown toward at least both first and second zones among the plural air-conditioning zones;

a plurality of air-blowing state changing units for changing a blowing range of the conditioned air blown from the air outlets, each of said plurality of air-blowing changing units being disposed in a respective air outlet; and an air-blowing state control unit for controlling an operation state of the air-blowing state changing units, in such a manner that a first air conditioning range of one air-blowing state changing unit for said first zone is restricted at a side proximate to the other air-conditioning zone at least including said second zone, and a second air conditioning range of another air-blowing state changing unit for said second zone is restricted at a side proximate to the other air conditioning zone at least including said first zone.

2. The air conditioner according to claim 1, wherein:
the air blowing-state changing units are disposed to respectively change the blowing state of conditioned air blown from each air outlet; and
the air-blowing state control unit controls the air-blowing state changing units in such a manner that the first air-conditioning range of the one air-blowing state changing unit is restricted from a front-seat direction of said first zone to a rear seat direction of an adjacent air-conditioning zone adjacent to said first zone.

3. The air conditioner according to claim 1, further comprising:
an actuator for driving and operating the air-blowing state changing units, the actuator including plural driving units having number smaller than number of the air-blowing state changing units, wherein:
the air-blowing state control unit controls the plural driving units to control the operation state of the air-blowing state changing units; and
the operation state is one of a swing range, a swinge stop time, an operation time for which the air-blowing state changing units are operated with an operation speed lower than a predetermined speed, and an operation range in which the air-blowing state changing units are operated with an operation speed lower than the predetermined speed.

4. The air conditioner according to claim 1, further comprising:
an actuator for driving and operating the air-blowing state changing units, the actuator including plural driving units having number smaller than number of the air-blowing state changing units, wherein:
the air-blowing state control unit controls the plural driving units to control operation state of the air-blowing state changing units so that air is blown from at least two of the air outlets to be approximately symmetrical relative to a center line.

5. The air conditioner according to claim 1, further comprising:
a driving unit for simultaneously operating both the air-blowing state changing units for adjacent two air-conditioning zones.

6. The air conditioner according to claim 1, wherein the air-blowing state control unit controls the air-blowing state changing units in such a manner that one of the air-blowing state changing units is operated with first operation patterns each having a first periodicity, the other one of the air-blowing state changing units is operated with second operation patterns each having a second periodicity, and a ratio of the first periodicity to the second periodicity is approximately an integer number.

7. The air conditioner according to claim 6, wherein:
each first operation pattern has a first starting time;
each second operation pattern has a second starting time; and
the first stating time is set to be approximately equal to the second starting time partially by plural periodic patterns.

8. The air conditioner according to claim 6, wherein:
each first operation pattern has a first finishing time;
each second operation pattern has a second finishing time; and
the first finishing time is set to be approximately equal to the second finishing time partially by plural periodic patterns.

9. The air conditioner according to claim 6, wherein:
each first operation pattern has a first ratio between operation time and stop time;
each second operation pattern has a second ratio between operation time and stop time; and
the first ratio is set to be approximately equal to the second ratio.

10. The air conditioner according to claim 1, wherein the air state to be independently blown into the plural air-conditioning zones is one of an air temperature, an air amount and an air-blowing direction.

11. The air conditioner according to claim 1, further comprising:
a center grill and side grills on both sides of the center grill, being disposed at a downstream end side of the air conditioning unit; and
an actuator for driving the air-blowing state changing units, the actuator being disposed in the center grill and the side grills.

12. The air conditioner according to claim 11, wherein the air-blowing state control unit controls the actuator in such a manner that an operation speed of the air-blowing state changing units disposed in the side grills is set to be slower than an operation speed of the air-blowing state changing unit disposed in the center grill.

13. The air conditioner according to claim 11, wherein the air-blowing state control unit controls the actuator in such a manner that a swing range of the air-blowing state changing units disposed in the side grills is set to be narrower than a swing range of the air-blowing state changing unit disposed in the center grill.

14. The air conditioner according to claim 11, wherein the air-blowing state control unit controls the actuator in such a manner that a first operation time for which the side grill is operated to be slower than a predetermined speed is made longer than a second operation time for which the center grill is operated to be slower than the predetermined speed.

15. The air conditioner according to claim 11, wherein the air-blowing state control unit controls the actuator in such a manner that a first operation range in which the side grill is operated to be slower than a predetermined speed is made larger than a second operation range in which the center grill is operated to be slower than the predetermined speed.

16. The air conditioner according to claim 1, wherein:
when the air-blowing state control unit determines a predetermined air-conditioning condition for the passenger compartment, the one air-blowing state changing unit for said first zone is released from said first air-conditioning range.

17. The air conditioner according to claim 16, wherein the air-blowing state control unit determines the predetermined air-conditioning condition for the passenger compartment, when satisfying at least one condition that when the air-blowing state changing unit is manually operated, when a predetermined air-conditioning zone is preferentially air-conditioned, and the when an air conditioning capacity of a predetermined air-conditioning zone is insufficient.

18. The air conditioner according to claim 1, further comprising:
right and left center grills being disposed at a downstream end side of the air conditioning unit, wherein
the air-blowing state changing units are disposed in the right and left center grills.

19. The air conditioner according to claim 1, wherein:
the air-blowing state control unit controls the air-blowing state changing units in such a manner that the one air-blowing state changing unit is operated with the first operation patterns each having a first swing range larger than a predetermined swing range and a first periodicity, the another air-blowing state changing unit is operated with second operation patterns each having a second swing range smaller than the predetermined range and a second periodicity, and a ratio of the first periodicity to the second periodicity is approximately 2.

20. The air conditioner according to claim 1, wherein:
the one air-blowing state changing unit is disposed at a side grill on a side where sunlight enters is operated with first operation patterns each having a first periodicity, the another air-blowing state changing unit disposed at a center grill is operated with second operation patterns each having a second periodicity, and a ratio of the first periodicity to the second periodicity is approximately ½.

21. The air conditioner according to claim 1, wherein:
the air-blowing state control unit changes at least one operation state of the air-blowing state changing units;
the operation state is one of a swing range, a swing stop at a swing end, a swing stop at a swing middle position, a swing stop position and a swing speed.

22. The air conditioner according to claim 1, wherein the air-blowing state control unit controls a swing range of the air blowing state changing units in such a manner that the swing range becomes narrower, as an outside air temperature, a post-evaporator temperature, a passenger compartment temperature, an air outlet temperature, an air flow amount, an air flow speed, a voltage applied to a blower, a sunlight amount, a passenger's temperature, a skin temperature, a seat temperature, a passenger's upper side temperature, a steering temperature, a windshield temperature, a wall surface temperature, a humidity, or an outside air introduction ratio becomes larger, as an air distribution ratio toward the upper side of a passenger becomes smaller, as a setting temperature or a vehicle speed becomes lower, or as sunlight direction is more toward a vehicle side.

23. The air conditioner according to claim 1, wherein at least one of the air-blowing state changing units is stopped or slowly operated in a direction toward a passenger on a front seat.

24. The air conditioner according to claim 1, wherein:
the air-blowing state control unit sets a stop time for which operation of at least one air-blowing state changing unit is stopped, and a slowly operating time for which at least one air-blowing state changing unit is slowly operated by an operation speed lower than a predetermined speed, in such a manner that the stop time or the slowly operating time become larger at a side where sunlight enters.

25. The air conditioner according to claim 1, wherein the air-blowing state control unit controls a swing range of the air-blowing state changing units, in such a manner that the swing range at a side where sunlight enters becomes narrower.

26. The air conditioner according to claim 1, wherein the air-blowing state control unit corrects the operation state of the air-blowing state changing units in accordance with at least one of a seat position, a seat shape, and a passenger's state.

27. The air conditioner according to claim 2, wherein said adjacent air-conditioning zone is said second zone.

28. The air conditioner according to claim 1, wherein each of the air-blowing state changing units is a swing louver which swings in a predetermined range.

29. An air conditioner for a vehicle having a passenger compartment, comprising:
an air conditioning unit having a plurality of air outlets for blowing conditioned air toward plural air-conditioning zones in the passenger compartment, the air conditioning unit being set to respectively independently adjust air temperature to be blown toward at least two of the plural air-conditioning zones;
a plurality of air-blowing state changing units for changing a blowing range of the conditioned air blown from the air outlets; and
an air-blowing state control unit for controlling an operation state of the air-blowing state changing units; and
an actuator for driving and operating the air-blowing state changing units, the actuator including plural driving units having number smaller than number of the air-blowing state changing units, wherein:
the air-blowing state control unit controls the plural driving units to control the operation state of the air-blowing state changing units; and
the operation state is one of a swing range, a swing stop time, a slow operation time for which the air-blowing state changing units are operated with an operation speed lower than a predetermined speed, and a slow operation range in which the air-blowing state changing units are operated with an operation speed lower than the predetermined speed.

30. The air conditioner according to claim 29, wherein the air-blowing state control unit sets the slow operation time and the slow operation range of the air-blowing state changing units in accordance with an air-conditioning load.

31. The air conditioner according to claim 30, wherein the air-conditioning load is detected from one or more parameters from a group consisting of:
an outside air temperature, a post-evaporator temperature, a passenger compartment temperature, an air outlet temperature, an air flow amount, an air flow speed, a voltage applied to a blower, a sunlight amount, a sunlight direction, a passenger's temperature, a skin temperature, a seat temperature, a passenger's upper side temperature, a steering temperature, a windshield temperature, a wall surface temperature, a humidity, an air outlet mode, a setting temperature, a vehicle speed, and an outside air introduction ratio.

32. The air conditioner according to claim 29, wherein the air-blowing state control unit controls the stop time, the slow operation time and the slow operation range of the air blowing state changing units in such a manner that the swing range becomes larger, as an outside air temperature, a post-evaporator temperature, a passenger compartment temperature, an air outlet temperature, an air flow amount, an air flow speed, a voltage applied to a blower, a sunlight amount, a passenger's temperature, a skin temperature, a seat temperature, a passenger's upper side temperature, a steering temperature, a windshield temperature, a wall surface temperature, a humidity, or an outside air introduction ratio becomes larger, as an air distribution ratio toward the upper side of a passenger becomes smaller, as a setting temperature or a vehicle speed becomes lower, or as sunlight direction is more toward a vehicle side.

33. The air conditioner according to claim 29, wherein each of the air-blowing state changing units is a swing louver which swings in a predetermined range.

34. An air conditioner for a vehicle having a passenger compartment, comprising:
an air conditioning unit having a plurality of air outlets for blowing conditioned air toward plural air-conditioning zones in the passenger compartment, the air conditioning unit being set to respectively independently adjust air temperature to be blown toward at least two of the plural air-conditioning zones;

a plurality of air-blowing state changing units for changing a blowing range of the conditioned air blown from the air outlets; and an air-blowing state control unit for controlling an operation state of the air-blowing state changing units; and an actuator for driving and operating the air-blowing state changing units, the actuator including plural driving units having number smaller than number of the air-blowing state changing units, wherein:

the air-blowing state control unit controls the plural driving units to control swing operations of the air-blowing state changing units so that air is blown from at least two of the air outlets to be approximately symmetrical relative to a center line.

35. The air conditioner according to claim 31, wherein each of the air-blowing state changing units is a swing louver which swings in a predetermined range.

36. An air conditioner for a vehicle having a passenger compartment, comprising:

an air conditioning unit having a plurality of air outlets for blowing conditioned air toward plural air-conditioning zones in the passenger compartment, the air conditioning unit being set to respectively independently adjust air temperature to be blown toward the plural air-conditioning zones;

a plurality of air-blowing state changing units for changing a blowing range of the conditioned air blown from the air outlets; and an air-blowing state control unit for controlling an operation state of the air-blowing state changing units, wherein the air-blowing state control unit controls the air-blowing state changing units in such a manner that one of the air-blowing state changing units is operated with first operation patterns each having a first periodicity, the other one of the air-blowing state changing units is operated with second operation patterns each having a second periodicity, and a ratio of the first periodicity to the second periodicity is approximately an integer number.

37. The air conditioner according to claim 36, wherein each of the air-blowing state changing units is a swing louver which swings in a predetermined range.

* * * * *